(12) United States Patent
Kwon et al.

(10) Patent No.: US 12,279,319 B2
(45) Date of Patent: Apr. 15, 2025

(54) ARTIFICIAL INTELLIGENCE DEVICE FOR PROVIDING DEVICE CONTROL FUNCTION BASED ON INTERWORKING BETWEEN DEVICES AND METHOD THEREFOR

(71) Applicant: LG ELECTRONICS INC., Seoul (KR)

(72) Inventors: Osung Kwon, Seoul (KR); Kunwoo Kim, Seoul (KR); Hyeseung Ryu, Seoul (KR); Seowoo Gong, Seoul (KR); Jimin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 491 days.

(21) Appl. No.: 17/641,010

(22) PCT Filed: Mar. 3, 2020

(86) PCT No.: PCT/KR2020/003019
§ 371 (c)(1),
(2) Date: Mar. 7, 2022

(87) PCT Pub. No.: WO2021/172642
PCT Pub. Date: Sep. 2, 2021

(65) Prior Publication Data
US 2022/0338281 A1    Oct. 20, 2022

(30) Foreign Application Priority Data
Feb. 26, 2020    (KR) .................. 10-2020-0023628

(51) Int. Cl.
*H04W 76/14*    (2018.01)
*G06F 40/20*    (2020.01)
(Continued)

(52) U.S. Cl.
CPC ............ *H04W 76/14* (2018.02); *G06F 40/20* (2020.01); *H04L 41/16* (2013.01); *H04L 45/08* (2013.01);
(Continued)

(58) Field of Classification Search
None
See application file for complete search history.

(56) References Cited

U.S. PATENT DOCUMENTS

2007/0274271 A1    11/2007    Jones et al.
2015/0372746 A1    12/2015    Xie et al.
(Continued)

FOREIGN PATENT DOCUMENTS

CN    104967888 A    10/2015
CN    109257729 A    1/2019
(Continued)

OTHER PUBLICATIONS

International Search Report for PCT/KR2020/003019 mailed on Nov. 11, 2020.
(Continued)

*Primary Examiner* — Natisha D Cox
(74) *Attorney, Agent, or Firm* — Birch, Stewart, Kolasch & Birch, LLP

(57) ABSTRACT

An artificial intelligence device including a communication unit; a memory configured to store a pairing information table including pairing information on paired devices; and a processor configured to search for pairable devices through the communication unit when entering a device pairing mode, pair with a target device of the pairable devices found through the communication unit, and update the pairing information table by adding pairing information associated with the target device to the pairing information table.

20 Claims, 13 Drawing Sheets

(51) Int. Cl.
    *H04L 41/16*     (2022.01)
    *H04L 45/02*     (2022.01)
    *H04L 67/14*     (2022.01)
    *H04W 8/26*     (2009.01)
    *H04W 76/15*     (2018.01)

(52) U.S. Cl.
    CPC ............... *H04L 67/14* (2013.01); *H04W 8/26* (2013.01); *H04W 76/15* (2018.02)

(56) References Cited

U.S. PATENT DOCUMENTS

| | | | |
|---|---|---|---|
| 2017/0245309 A1* | 8/2017 | Park | G08C 23/04 |
| 2018/0351763 A1 | 12/2018 | Ock et al. | |
| 2020/0035235 A1 | 1/2020 | Lee | |
| 2020/0092234 A1* | 3/2020 | Yang | H04L 67/306 |
| 2021/0035561 A1* | 2/2021 | D'Amato | G10L 15/22 |
| 2021/0174187 A1 | 6/2021 | Han et al. | |

FOREIGN PATENT DOCUMENTS

| | | | | |
|---|---|---|---|---|
| CN | 107251530 B | * | 7/2021 | G05B 15/02 |
| KR | 10-2007-0098168 A | | 10/2007 | |
| KR | 10-2014-0045109 A | | 4/2014 | |
| KR | 10-2017-0067917 A | | 6/2017 | |
| KR | 10-2019-0084202 A | | 7/2019 | |
| KR | 10-2019-0095193 A | | 8/2019 | |
| KR | 10-2025566 B1 | | 9/2019 | |
| KR | 20190102161 A | * | 9/2019 | H04B 1/40 |
| KR | 10-2042689 B1 | | 11/2019 | |
| WO | WO 2017/091021 A1 | | 6/2017 | |

OTHER PUBLICATIONS

Office Action issued in KR Application No. 10-2020-0023628, dated Oct. 28, 2021.

* cited by examiner

FIG. 6
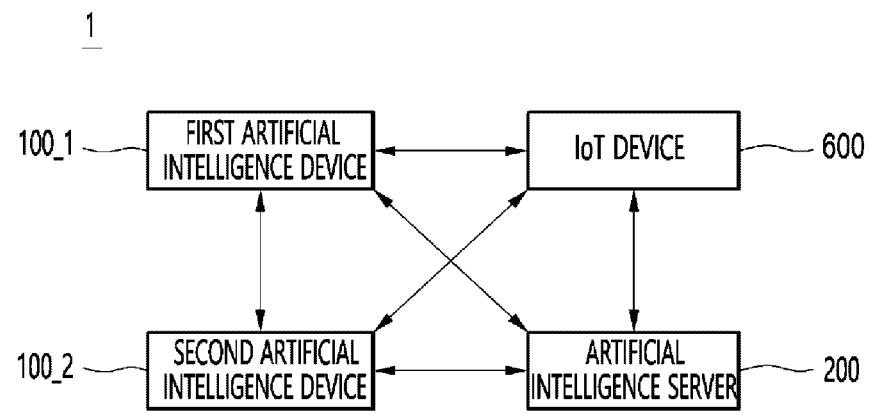
(a)
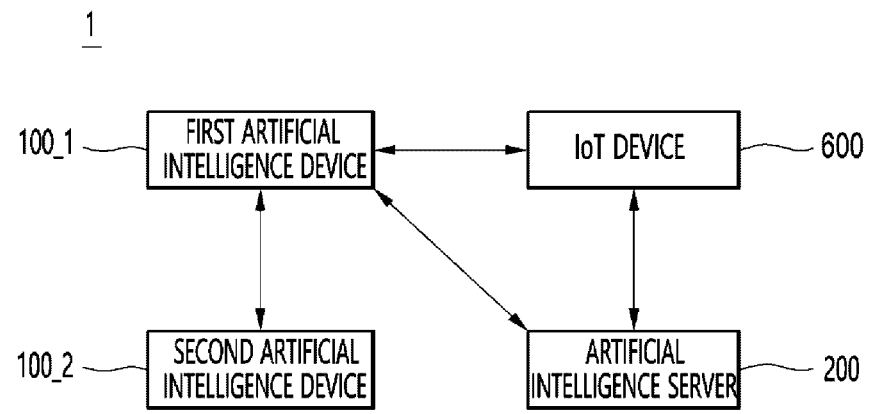
(b)
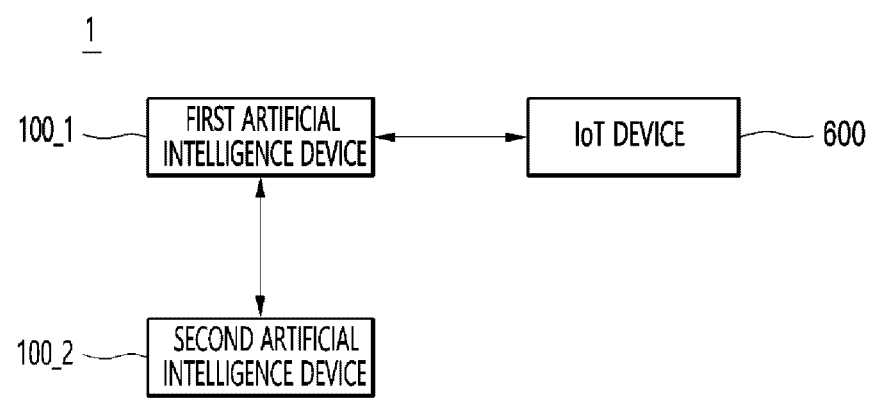
(c)

FIG. 12

| Pairing information | First paired device | | | Second paired device | | | Communication method | Pairing platform |
|---|---|---|---|---|---|---|---|---|
| | Name | Nickname | Identification information | Name | Nickname | Identification information | | |
| First pairing information | First AI device | Refrigerator | 1a2df2ce | Second AI device | Air conditioner | 32dcgh3ws | Wi-Fi | First platform |
| Second pairing information | | | | Third AI device | Washing machine | hhac0ph5 | Wi-Fi | First platform |
| Third pairing information | | | | IoT device | Temperature sensor | c35gs21t | BLE | Second platform |
| Fourth pairing information | | | | AI device | Server | ppk39dn | Ethernet/Wi-Fi | First platform |

ARTIFICIAL INTELLIGENCE DEVICE FOR PROVIDING DEVICE CONTROL FUNCTION BASED ON INTERWORKING BETWEEN DEVICES AND METHOD THEREFOR

CROSS-REFERENCE TO A RELATED APPLICATION

This application is the National Phase of PCT International Application No. PCT/KR2020/003019, filed on Mar. 3, 2020, which claims priority under 35 U.S.C. 119(a) to Patent Application No. 10-2020-0023628, filed in Republic of Korea on Feb. 26, 2020, all of which are hereby expressly incorporated by reference into the present application.

TECHNICAL FIELD

The present disclosure relates to an artificial intelligence device and method for providing a device control function based on inter-device paring.

BACKGROUND ART

Recently, many artificial intelligence devices that are equipped with artificial intelligence-based technology to provide various functions have been widely distributed, greatly increasing the convenience of daily life. These artificial intelligence devices can provide an operation determined in consideration of context information or usage record, and can provide various functions according to voice recognition or image recognition. As the number of artificial intelligence devices used by users increases, a necessity to manage and control several artificial intelligence devices by linking them increases.

However, conventionally, only a service for linking a plurality of artificial intelligence devices is provided by registering the artificial intelligence devices in a user's account. Such an account-oriented link service is inconvenient in that, when a plurality of users exist, it is necessary to separately register each user in order to use the link service. When artificial intelligence devices are linked based on inter-device pairing, it is possible to provide a device control service to multiple users.

SUMMARY

An object of the present disclosure is to provide an artificial intelligence device and a method for providing a function of controlling a directly- or indirectly-paired device based on inter-device pairing.

An embodiment of the present disclosure provides an artificial intelligent device and a method for searching for pairable devices when entering a device pairing mode, pairing with a target device among the pairable devices, and updating a pairing information table by adding pairing information associated with the target device to the paring information table.

Further, an embodiment of the present disclosure provides an artificial intelligence device and a method for sharing a pairing information table with a paired device or an artificial intelligence server.

In addition, an embodiment of the present disclosure an artificial intelligent device and a method for determining information on a transmitting device that transmits a command corresponding to a device use command when receiving a device use command, information on a receiving device that receives and performs the command, and an operation command, determine a connection path from the transmitting device to the receiving device, generating a command corresponding to the device use command in consideration of the connection path, and transmitting the command according to the connection path.

Further, an embodiment of the present disclosure provides an artificial intelligence device and a method for determining a connection path by using a pairing information table of another device stored in a memory.

Another embodiment of the present disclosure provides an artificial intelligence device and a method for determining a connection path by requesting a connection path from an artificial intelligence server.

Still another embodiment of the present disclosure provides an artificial intelligence device and a method for determining whether the receiving device is a directly paired device using the pairing information table, and when the receiving device is not the directly paired device, requesting a connection path from the directly paired device to the receiving device, and determining the connection path based on the connection path received from the directly paired device.

Advantageous Effects

According to various embodiments of the present disclosure, it is possible to construct a user-independent device paring system by performing inter-device pairing without using user account information.

According to various embodiments of the present disclosure, it is possible to control an operation of an indirectly-paired device through an artificial intelligence server or a directly-paired device.

Further, according to various embodiments of the present disclosure, it is possible to reduce the security problem due to the sharing of device paring information by identifying an indirectly-paired device even when the pairing information table of another device is not stored.

BRIEF DESCRIPTION OF THE DRAWINGS

The present disclosure will become more fully understood from the detailed description given hereinbelow and the accompanying drawings, which are given by illustration only, and thus are not limitative of the present disclosure, and wherein:

FIG. 6 is a diagram illustrating artificial intelligence systems that provide a device control function based on pairing between devices according to various embodiments of the present disclosure.

FIG. 12 is a diagram illustrating an example of a pairing information table according to an embodiment of the present disclosure.

DETAILED DESCRIPTION OF THE EMBODIMENTS

Figure 1:
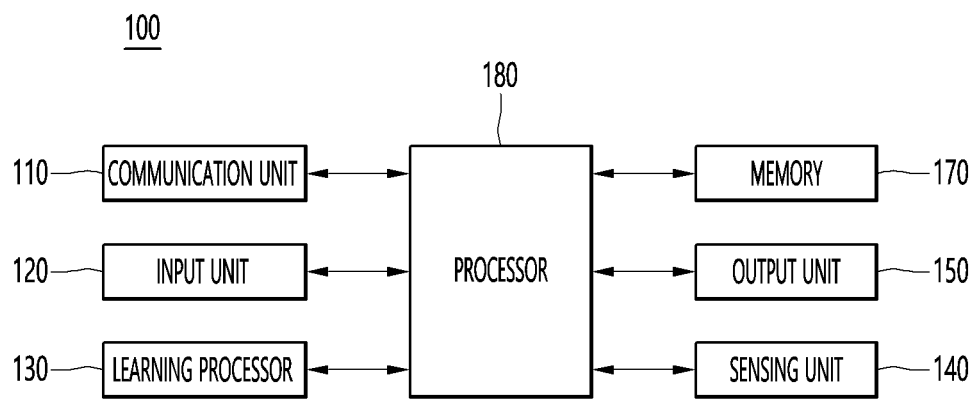
FIG. 1 illustrates an AI device according to an embodiment of the present disclosure.

Hereinafter, the embodiments disclosed herein will be described in detail with reference to the accompanying drawings, and the same or similar elements are designated with the same numeral references regardless of the numerals in the drawings and their redundant description will be omitted. The suffixes "module" and "unit or portion" for components used in the following description are merely provided only for facilitation of preparing this specification, and thus they are not granted a specific meaning or function. In addition, when it is determined that the detailed description of the related known technology can obscure the gist of embodiments disclosed herein in describing the embodiments, a detailed description thereof will be omitted. Further, the accompanying drawings are intended to facilitate understanding of the embodiments disclosed herein, and the technical spirit disclosed herein are not limited by the accompanying drawings. Therefore, the present disclosure should be construed as including all the changes, equivalents, and substitutions included in the spirit and scope of the present disclosure.

The terms coming with ordinal numbers such as 'first', 'second', or the like can be used to denote various components, but the components are not limited by the terms. The terms are used merely for the purpose to distinguish a component from the other component.

It will also be understood that when an element is referred to as being "connected" or "coupled" to another element, it can be directly connected or coupled to the other element or intervening elements can be present. In contrast, when an element is referred to as being "directly connected" or "directly coupled" to another element, there are no intervening elements present.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and can mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network can include an input layer, an output layer, and optionally one or more hidden layers. Each layer includes one or more neurons, and the artificial neural network can include a synapse that links neurons to neurons. In the artificial neural network, each neuron can output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network can be to determine the model parameters that minimize a loss function. The loss function can be used as an index to determine optimal model parameters in the learning process of the artificial neural network.

Machine learning can be classified into supervised learning, unsupervised learning, and reinforcement learning according to a learning method.

The supervised learning can refer to a method of learning an artificial neural network when a label for learning data is given, and the label can include the correct answer (or result value) that the artificial neural network must infer when the learning data is input to the artificial neural network. The unsupervised learning can refer to a method of learning an artificial neural network when a label for learning data is not given. Further, the reinforcement learning can refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

<Robot>

A robot can refer to a machine that automatically processes or operates a given task by its own ability. In particular, a robot having a function of recognizing an environment and performing a self-determination operation can be referred to as an intelligent robot.

Further, robots can be classified into industrial robots, medical robots, home robots, military robots, and the like according to the use purpose or field. The robot includes a driving unit can include an actuator or a motor and can perform various physical operations such as moving a robot joint. In addition, a movable robot can include a wheel, a brake, a propeller, and the like in the driving unit, and can travel on the ground through the driving unit or fly in the air.

<Self-Driving>

Self-driving refers to a technique of driving for oneself, and a self-driving vehicle refers to a vehicle that travels without an operation of a user or with a minimum operation of a user. For example, the self-driving can include a technology for maintaining a lane while driving, a technology for automatically adjusting a speed, such as adaptive cruise control, a technique for automatically traveling along a predetermined route, and a technology for automatically setting and traveling a route when a destination is set.

The vehicle can be a vehicle having only an internal combustion engine, a hybrid vehicle having an internal combustion engine and an electric motor together, and an electric vehicle having only an electric motor, and can include not only an automobile but also a train, a motorcycle, and the like.

Further, the self-driving vehicle can be regarded as a robot having a self-driving function.

<eXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

Further, the MR technology is similar to the AR technology in that the real object and the virtual object are shown together. However, in the AR technology, the virtual object is used in the form that complements the real object, whereas in the MR technology, the virtual object and the real object are used in an equal manner.

In addition, the XR technology can be applied to a head-mount display (HMD), a head-up display (HUD), a mobile phone, a tablet PC, a laptop, a desktop, a TV, a digital signage, and the like. A device to which the XR technology is applied can be referred to as an XR device.

Next, FIG. 1 illustrates an AI device according to an embodiment of the present disclosure. Hereinafter, the artificial intelligence device 100 can be referred to as a terminal 100.

The AI device 100 can be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 can include a communication unit 110, an input unit 120, a learning processor 130, a sensing unit 140, an output unit 150, a memory 170, and a processor 180. The communication unit 110 can transmit and receive data to and from external devices such as other AI devices 100a to 100e and the AI server 200 (see FIG. 3) by using wire/wireless communication technology. For example, the communication unit 110 can transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™ RFID (Radio Frequency Identification), Infrared Data Association (IrDA), ZigBee, NFC (Near Field Communication), and the like.

The input unit 120 can acquire various kinds of data. Further, the input unit 120 can include a camera for inputting a video signal, a microphone for receiving an audio signal, and a user input unit for receiving information from a user. The camera or the microphone can be treated as a sensor, and the signal acquired from the camera or the microphone can be referred to as sensing data or sensor information.

In addition, the input unit 120 can acquire a learning data for model learning and an input data to be used when an output is acquired by using learning model. The input unit 120 can also acquire raw input data. In this instance, the processor 180 or the learning processor 130 can extract an input feature by preprocessing the input data.

The learning processor 130 can learn a model composed of an artificial neural network by using learning data. The learned artificial neural network can be referred to as a learning model. Also, the learning model can be used to an infer result value for new input data rather than learning data, and the inferred value can be used as a basis for determination to perform a certain operation.

Further, the learning processor 130 can perform AI processing together with the learning processor 240 of the AI server 200. The learning processor 130 can include a memory integrated or implemented in the AI device 100. Alternatively, the learning processor 130 can be implemented by using the memory 170, an external memory directly connected to the AI device 100, or a memory held in an external device.

In addition, the sensing unit 140 can acquire at least one of internal information about the AI device 100, ambient environment information about the AI device 100, and user information by using various sensors.

Examples of the sensors included in the sensing unit 140 can include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

Also, the output unit 150 can generate an output related to a visual sense, an auditory sense, or a haptic sense. Further, the output unit 150 can include a display unit for outputting time information, a speaker for outputting auditory information, and a haptic module for outputting haptic information.

The memory 170 can store data that supports various functions of the AI device 100. For example, the memory 170 can store input data acquired by the input unit 120, learning data, a learning model, a learning history, and the like.

Also, the processor 180 can determine at least one executable operation of the AI device 100 based on information determined or generated by using a data analysis algorithm or a machine learning algorithm. The processor 180 can also control the components of the AI device 100 to execute the determined operation.

To this end, the processor 180 can request, search, receive, or utilize data of the learning processor 130 or the memory 170. The processor 180 can also control the components of the AI device 100 to execute the predicted operation or the operation determined to be desirable among the at least one executable operation.

When the connection of an external device is required to perform the determined operation, the processor 180 can generate a control signal for controlling the external device and can transmit the generated control signal to the external device. The processor 180 can also acquire intention information for the user input and can determine the user's requirements based on the acquired intention information.

The processor 180 can acquire the intention information corresponding to the user input by using at least one of a speech to text (STT) engine for converting speech input into a text string or a natural language processing (NLP) engine for acquiring intention information of a natural language.

At least one of the STT engine or the NLP engine can be configured as an artificial neural network, at least part of which is learned according to the machine learning algorithm. Further, at least one of the STT engine or the NLP engine can be learned by the learning processor 130, can be learned by the learning processor 240 of the AI server 200, or can be learned by their distributed processing.

The processor 180 can also collect history information including the operation contents of the AI apparatus 100 or the user's feedback on the operation and store the collected history information in the memory 170 or the learning processor 130 or transmit the collected history information to the external device such as the AI server 200. The collected history information can also be used to update the learning model.

In addition, the processor 180 can control at least part of the components of AI device 100 so as to drive an application program stored in memory 170. Furthermore, the processor 180 can operate two or more of the components included in the AI device 100 in combination so as to drive the application program.

Figure 2:
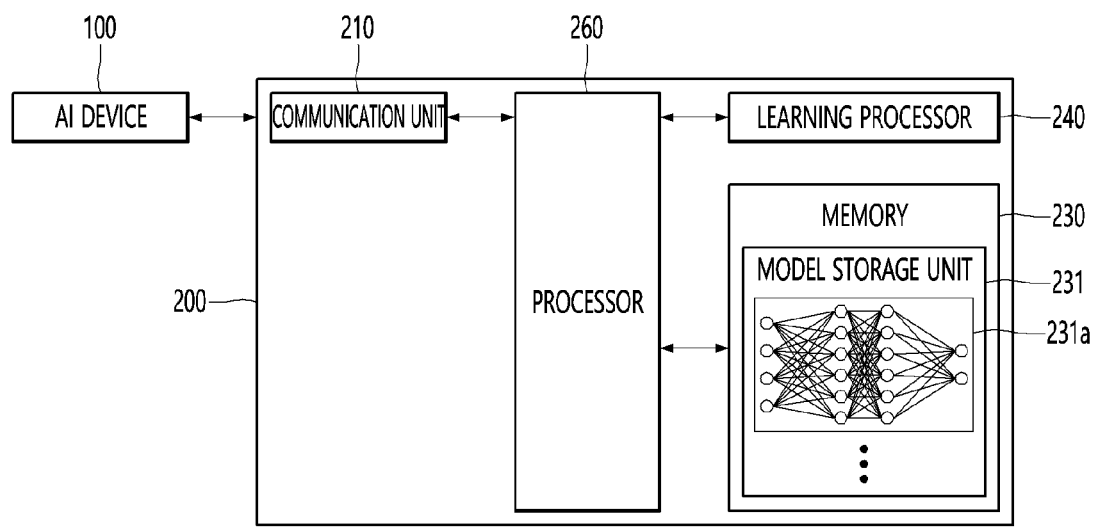
FIG. 2 is a diagram illustrating an AI server according to an embodiment of the present disclosure.

Next, FIG. 2 is a diagram illustrating an AI server according to an embodiment of the present disclosure. Referring to FIG. 2, the AI server 200 can refer to a device that learns an artificial neural network by using a machine learning algorithm or uses a learned artificial neural network. The AI server 200 may include a plurality of servers to perform distributed processing, or may be defined as a 5G network. Further, the AI server 200 may be included as a partial configuration of the AI device 100, and may perform at least part of the AI processing together.

In addition, the AI server 200 can include a communication unit 210, a memory 230, a learning processor 240, a processor 260, and the like. The communication unit 210 can transmit and receive data to and from an external device such as the AI device 100. The memory 230 may include a model storage unit 231 storing a learning or learned model (or an artificial neural network 231*a*) through the learning processor 240.

Further, the learning processor 240 can learn the artificial neural network 231*a* by using the learning data. The learning model can be used in a state of being mounted on the AI server 200 of the artificial neural network, or can be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

Further, the processor 260 can infer the result value for new input data by using the learning model and generate a response or a control command based on the inferred result value.

Figure 3:
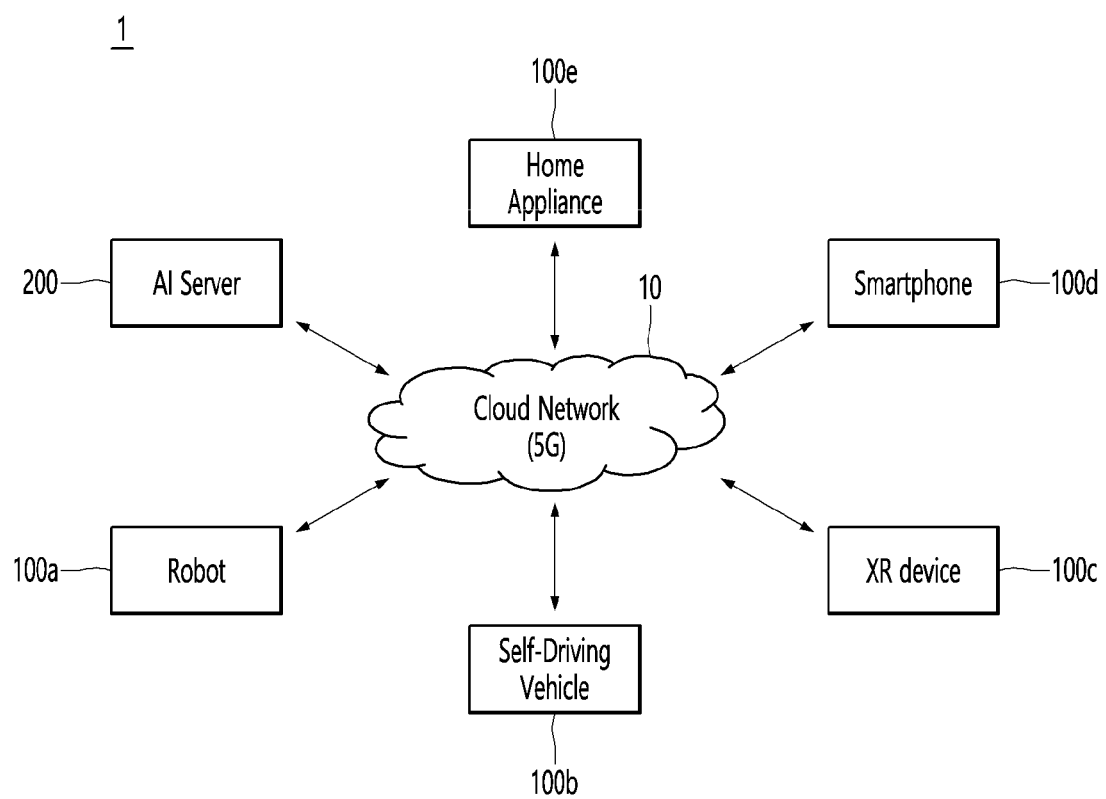
FIG. 3 is a diagram illustrating an AI system according to an embodiment of the present disclosure.

FIG. 3 a diagram illustrating an AI system 1 according to an embodiment of the present disclosure. Referring to FIG. 3, in the AI system 1, at least one of an AI server 200, a robot 100*a*, a self-driving vehicle 100*b*, an XR device 100*c*, a smartphone 100*d*, or a home appliance 100*e* is connected to a cloud network 10. The robot 100*a*, the self-driving vehicle 100*b*, the XR device 100*c*, the smartphone 100*d*, or the home appliance 100*e*, to which the AI technology is applied, can be referred to as AI devices 100*a* to 100*e*.

The cloud network 10 refers to a network that forms part of a cloud computing infrastructure or exists in a cloud computing infrastructure. The cloud network 10 may be configured by using a 3G network, a 4G or LTE network, or a 5G network.

That is, the devices 100*a* to 100*e* and 200 configuring the AI system 1 can be connected to each other through the cloud network 10. In particular, each of the devices 100*a* to 100*e* and 200 can communicate with each other through a base station, but can also directly communicate with each other without using a base station.

The AI server 200 includes a server that performs AI processing and a server that performs operations on big data. The AI server 200 can be connected to at least one of the AI devices constituting the AI system 1, that is, the robot 100*a*, the self-driving vehicle 100*b*, the XR device 100*c*, the smartphone 100*d*, or the home appliance 100*e* through the cloud network 10, and can assist at least part of AI processing of the connected AI devices 100*a* to 100*e*.

Further, the AI server 200 can learn the artificial neural network according to the machine learning algorithm instead of the AI devices 100*a* to 100*e*, and can directly store the learning model or transmit the learning model to the AI devices 100*a* to 100*e*. Also, the AI server 200 can receive input data from the AI devices 100*a* to 100*e*, can infer the result value for the received input data by using the learning model, can generate a response or a control command based on the inferred result value, and can transmit the response or the control command to the AI devices 100*a* to 100*e*.

Alternatively, the AI devices 100*a* to 100*e* can infer the result value for the input data by directly using the learning model, and can generate the response or the control command based on the inference result.

Hereinafter, various embodiments of the AI devices 100*a* to 100*e* to which the above-described technology is applied will be described. The AI devices 100*a* to 100*e* illustrated in FIG. 3 may be regarded as a specific embodiment of the AI device 100 illustrated in FIG. 1.

<AI+Robot>

The robot 100*a*, to which the AI technology is applied, can be implemented as a guide robot, a carrying robot, a cleaning robot, a wearable robot, an entertainment robot, a pet robot, an unmanned flying robot, or the like. The robot 100*a* may include a robot control module for controlling the operation, and the robot control module may refer to a software module or a chip implementing the software module by hardware.

Further, the robot 100*a* can acquire state information about the robot 100*a* by using sensor information acquired from various kinds of sensors, detect (recognize) surrounding environment and objects, can generate map data, determine the route and the travel plan, can determine the response to user interaction, or determine the operation.

The robot 100*a* can also use the sensor information acquired from at least one sensor among the lidar, the radar, and the camera so as to determine the travel route and the travel plan. The robot 100*a* can perform the above-described operations by using the learning model composed of at least one artificial neural network. For example, the robot 100*a* can recognize the surrounding environment and the objects by using the learning model, and determine the operation by using the recognized surrounding information or object information. The learning model can also be learned directly from the robot 100*a* or be learned from an external device such as the AI server 200.

Further, the robot 100*a* can perform the operation by generating the result by directly using the learning model, but the sensor information may be transmitted to the external device such as the AI server 200 and the generated result may be received to perform the operation.

In addition, the robot 100*a* can use at least one of the map data, the object information detected from the sensor information, or the object information acquired from the external apparatus to determine the travel route and the travel plan, and control the driving unit such that the robot 100*a* travels along the determined travel route and travel plan.

The map data may include object identification information about various objects arranged in the space in which the robot 100*a* moves. For example, the map data may include object identification information about fixed objects such as walls and doors and movable objects such as pollen and desks. The object identification information may include a name, a type, a distance, and a position.

In addition, the robot 100*a* can perform the operation or travel by controlling the driving unit based on the control/interaction of the user. Further, the robot 100*a* can acquire the intention information of the interaction due to the user's operation or speech utterance, determine the response based on the acquired intention information, and perform the operation.

<AI+Self-Driving>

The self-driving vehicle 100*b*, to which the AI technology is applied, can be implemented as a mobile robot, a vehicle, an unmanned flying vehicle, or the like. The self-driving vehicle 100*b* can include a self-driving control module for controlling a self-driving function, and the self-driving control module can refer to a software module or a chip implementing the software module by hardware. The self-driving control module can also be included in the self-driving vehicle 100*b* as a component thereof, but may be implemented with separate hardware and connected to the outside of the self-driving vehicle 100*b*.

In addition, the self-driving vehicle 100*b* can acquire state information about the self-driving vehicle 100*b* by using sensor information acquired from various kinds of sensors, detect (recognize) surrounding environment and objects, generate map data, determine the route and the travel plan, or determine the operation.

Like the robot 100*a*, the self-driving vehicle 100*b* can use the sensor information acquired from at least one sensor among the lidar, the radar, and the camera so as to determine the travel route and the travel plan. In particular, the self-driving vehicle 100*b* can recognize the environment or objects for an area covered by a field of view or an area over a certain distance by receiving the sensor information from external devices, or receive directly recognized information from the external devices.

The self-driving vehicle 100*b* can perform the above-described operations by using the learning model composed of at least one artificial neural network. For example, the self-driving vehicle 100*b* can recognize the surrounding environment and the objects by using the learning model, and determine the traveling movement line by using the recognized surrounding information or object information. The learning model can be learned directly from the self-driving vehicle 100*a* or be learned from an external device such as the AI server 200.

Further, the self-driving vehicle 100*b* can perform the operation by generating the result by directly using the learning model, but the sensor information may be transmitted to the external device such as the AI server 200 and the generated result may be received to perform the operation.

The self-driving vehicle 100*b* can use at least one of the map data, the object information detected from the sensor information, or the object information acquired from the external apparatus to determine the travel route and the travel plan, and can control the driving unit such that the self-driving vehicle 100*b* travels along the determined travel route and travel plan.

The map data may include object identification information about various objects arranged in the space (for example, road) in which the self-driving vehicle 100*b* travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100*b* can perform the operation or travel by controlling the driving unit based on the control/interaction of the user. Further, the self-driving vehicle 100*b* can acquire the intention information of the interaction due to the user's operation or speech utterance, and determine the response based on the acquired intention information, and perform the operation.

<AI+XR>

The XR device 100*c*, to which the AI technology is applied, can be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100*c* can analyzes three-dimensional point cloud data or image data acquired from various sensors or the external devices, generate position data and attribute data for the three-dimensional points, acquire information about the surrounding space or the real object, and render to output the XR object to be output. For example, the XR device 100*c* can output an XR object including the additional information about the recognized object in correspondence to the recognized object.

The XR device 100*c* can perform the above-described operations by using the learning model composed of at least one artificial neural network. For example, the XR device 100*c* can recognize the real object from the three-dimensional point cloud data or the image data by using the learning model, and provide information corresponding to the recognized real object. The learning model can be directly learned from the XR device 100*c*, or can be learned from the external device such as the AI server 200.

Further, the XR device 100*c* can perform the operation by generating the result by directly using the learning model, but the sensor information may be transmitted to the external device such as the AI server 200 and the generated result may be received to perform the operation.

<AI+Robot+Self-Driving>

The robot 100*a*, to which the AI technology and the self-driving technology are applied, can be implemented as a guide robot, a carrying robot, a cleaning robot, a wearable robot, an entertainment robot, a pet robot, an unmanned flying robot, or the like. The robot 100*a*, to which the AI technology and the self-driving technology are applied, can refer to the robot itself having the self-driving function or the robot 100*a* interacting with the self-driving vehicle 100*b*.

Further, the robot 100*a* having the self-driving function can collectively refer to a device that moves for itself along the given movement line without the user's control or moves for itself by determining the movement line by itself.

The robot 100*a* and the self-driving vehicle 100*b* having the self-driving function can use a common sensing method so as to determine at least one of the travel route or the travel plan. For example, the robot 100*a* and the self-driving vehicle 100*b* having the self-driving function can determine at least one of the travel route or the travel plan by using the information sensed through the lidar, the radar, and the camera.

The robot 100*a* that interacts with the self-driving vehicle 100*b* exists separately from the self-driving vehicle 100*b* and can perform operations pairing with the self-driving function of the self-driving vehicle 100b or pairing with the user who rides on the self-driving vehicle 100b.

Further, the robot 100a interacting with the self-driving vehicle 100b can control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b can monitor the user boarding the self-driving vehicle 100b, or control the function of the self-driving vehicle 100b through the interaction with the user. For example, when it is determined that the driver is in a drowsy state, the robot 100a can activate the self-driving function of the self-driving vehicle 100b or assist the control of the driving unit of the self-driving vehicle 100b. The function of the self-driving vehicle 100b controlled by the robot 100a can include not only the self-driving function but also the function provided by the navigation system or the audio system provided in the self-driving vehicle 100b.

Alternatively, the robot 100a that interacts with the self-driving vehicle 100b can provide information or assist the function to the self-driving vehicle 100b outside the self-driving vehicle 100b. For example, the robot 100a can provide traffic information including signal information and the like, such as a smart signal, to the self-driving vehicle 100b, and automatically connect an electric charger to a charging port by interacting with the self-driving vehicle 100b like an automatic electric charger of an electric vehicle.

<AI+Robot+XR>

The robot 100a, to which the AI technology and the XR technology are applied, can be implemented as a guide robot, a carrying robot, a cleaning robot, a wearable robot, an entertainment robot, a pet robot, an unmanned flying robot, a drone, or the like.

The robot 100a, to which the XR technology is applied, can refer to a robot that is subjected to control/interaction in an XR image. In this case, the robot 100a may be separated from the XR device 100c and interwork with each other.

When the robot 100a, which is subjected to control/interaction in the XR image, can acquire the sensor information from the sensors including the camera, the robot 100a or the XR device 100c can generate the XR image based on the sensor information, and the XR device 100c can output the generated XR image. The robot 100a can operate based on the control signal input through the XR device 100c or the user's interaction.

For example, the user can confirm the XR image corresponding to the time point of the robot 100a pairing remotely through the external device such as the XR device 100c, adjust the self-driving travel path of the robot 100a through interaction, control the operation or driving, or confirm the information about the surrounding object.

<AI+Self-Driving+XR>

The self-driving vehicle 100b, to which the AI technology and the XR technology are applied, can be implemented as a mobile robot, a vehicle, an unmanned flying vehicle, or the like. The self-driving driving vehicle 100b, to which the XR technology is applied, can refer to a self-driving vehicle having a mechanism for providing an XR image or a self-driving vehicle that is subjected to control/interaction in an XR image. Particularly, the self-driving vehicle 100b that is subjected to control/interaction in the XR image can be distinguished from the XR device 100c and interwork with each other.

The self-driving vehicle 100b having the mechanism for providing the XR image can acquire the sensor information from the sensors including the camera and output the generated XR image based on the acquired sensor information. For example, the self-driving vehicle 100b may include an HUD to output an XR image, thereby providing a passenger with a real object or an XR object corresponding to an object in the screen.

Further, when the XR object is output to the HUD, at least part of the XR object can be output so as to overlap the actual object to which the passenger's gaze is directed. When the XR object is output to the display provided in the self-driving vehicle 100b, at least part of the XR object can be output so as to overlap the object in the screen. For example, the self-driving vehicle 100b can output XR objects corresponding to objects such as a lane, another vehicle, a traffic light, a traffic sign, a two-wheeled vehicle, a pedestrian, a building, and the like.

When the self-driving vehicle 100b, which is subjected to control/interaction in the XR image, can acquire the sensor information from the sensors including the camera, the self-driving vehicle 100b or the XR device 100c can generate the XR image based on the sensor information, and the XR device 100c can output the generated XR image. The self-driving vehicle 100b can operate based on the control signal input through the external device such as the XR device 100c or the user's interaction.

Figure 4:
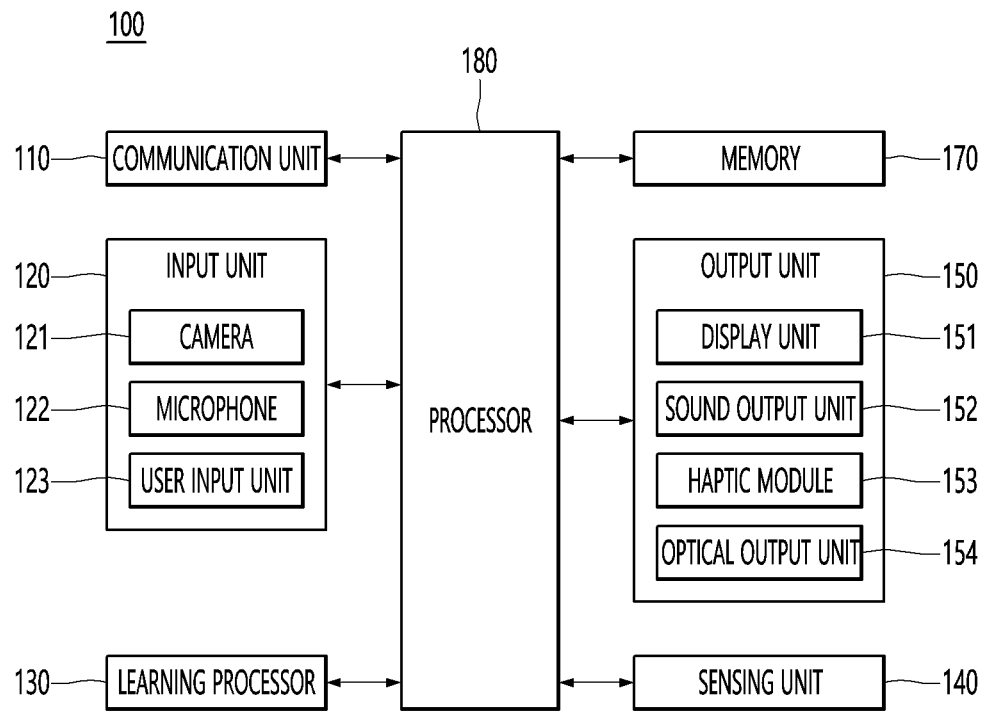
FIG. 4 is a block diagram illustrating an AI device according to an embodiment of the present disclosure.

Next, FIG. 4 is a block diagram illustrating an AI device according to an embodiment of the present disclosure. A description overlapping that given with reference to FIG. 1 will be omitted. The communication unit 110 can also be referred to as a communication modem or a communication circuit, and the input unit 120 can be referred to as an input interface. Further, the output unit 150 can be referred to as an output interface.

Referring to FIG. 4, the input unit 120 may include a camera 121 for inputting an image signal, a microphone 122 for receiving an audio signal, and a user input unit 123 for receiving information from a user. The speech data or image data collected by the input unit 120 can be analyzed and processed as a control command of the user.

The input unit 120 is for inputting image information (or signal), audio information (or signal), data, or information input from a user. In order to input image information, the AI device 100 may include one or a plurality of cameras 121.

The camera 121 processes image frames such as still images or moving images obtained by an image sensor in a video call mode or a photographing mode. The processed image frames can be displayed on the display unit 151 or stored in the memory 170.

The microphone 122 processes external sound signals as electrical speech data. The processed speech data can be utilized in various ways according to a function (or running application program) being performed in the AI device 100. Meanwhile, various noise reduction algorithms can be applied in the microphone 122 to remove noise occurring in the process of receiving an external sound signal.

The user input unit 123 is for receiving information from a user. When information is input through the user input unit 123, the processor 180 can control the operation of the AI device 100 to correspond to the input information when the information is inputted through the user input unit 123.

The user input unit 123 can include a mechanical input mechanism (or a mechanical key, for example, a button, a dome switch, a jog wheel, or a jog switch located at the front/rear or side of the AI device 100) and a touch input mechanism. As an example, the touch input mechanism can include a virtual key, a soft key, or a visual key displayed on the touch screen through software processing, or a touch key disposed in the other portion than the touch screen.

The sensing unit 140 can be referred to as a sensor unit. Further, the output unit 150 can include at least one of a display unit 151, a sound output unit 152, a haptic module 153, and an optical output unit 154. The display unit 151 displays (outputs) information processed by the AI device 100. For example, the display unit 151 can display execution screen information of an application program running on the AI device 100, or UI (User Interface) or Graphic User Interface (GUI) information according to the execution screen information.

The display unit 151 may implement a touch screen in such a manner that the display unit 151 forms a layer structure with or is integrally formed with a touch sensor. Such a touch screen can function as a user input unit 123 that provides an input interface between the AI device 100 and the user and can provide an output interface between the terminal 100 and the user at the same time.

The sound output unit 152 can output audio data received from the communication unit 110 or stored in the memory 170 in call signal reception, a call mode or a recording mode, a speech recognition mode, a broadcast reception mode, or the like. The sound output unit 152 may include at least one of a receiver, a speaker, and a buzzer.

The haptic module 153 generates various tactile effects that a user is able to feel. A representative example of the tactile effect generated by the haptic module 153 can be vibration.

The optical output unit 154 outputs a signal for notifying occurrence of an event by using light of a light source of the AI device 100. Examples of events generated by the AI device 100 include message reception, call signal reception, a missed call, an alarm, schedule notification, email reception, and information reception through an application, and the like.

Figure 5:
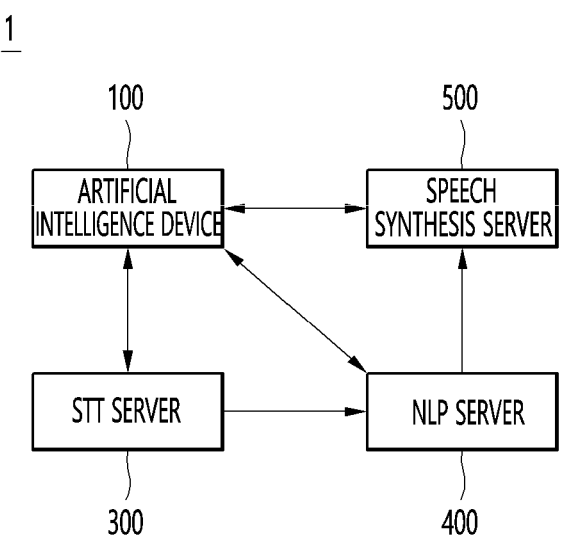
FIG. 5 is a block diagram illustrating an artificial intelligence system according to an embodiment of the present disclosure.

Next, FIG. 5 is a block diagram illustrating an artificial intelligence system 1 according to an embodiment of the present disclosure. Referring to FIG. 5, the artificial intelligence system 1 can include an artificial intelligence device 100, a speech to text (STT, Speech To Text) server 300, a natural language processing (NLP) server 400 and a speech synthesis server 500.

The artificial intelligence device 100 can transmit speech data to the STT server 300. The STT server 300 can convert the speech data received from the artificial intelligence device 100 into text data. The NLP server 400 can receive text data from the STT server 300, and can perform intention analysis on the text data based on the received text data. The NLP server 400 can transmit intention analysis information indicating a result of performing the intention analysis to the artificial intelligence device 100 or the speech synthesis server 500. Further, the speech synthesis server 500 can generate a synthesized speech reflecting a user's intention based on the intention analysis information, and transmit the generated synthesized speech to the artificial intelligence device 100.

The STT server 300 can increase the accuracy of speech-text conversion by using a language model. The language model can refer to a model capable of calculating the probability of a sentence or calculating probability that the next word will appear when previous words are given. For example, the language model can include probabilistic language models such as a Unigram model, a Bigram model, an N-gram model, and the like. The unigram model is a model assuming that the uses of all words are completely independent of each other, and a model that calculates the probability of a string of words as the product of the probabilities of the words. The bigram model is a model assuming that the use of a word depends only on one previous word. The N-gram model is a model assuming that the use of a word depends on the previous (n−1) words.

That is, the STT server 300 can determine whether the text data converted from speech data is properly converted by using the language model, thereby increasing the accuracy of the conversion from the speech data to the text data.

The NLP server 400 can generate the intention analysis information by sequentially performing a morpheme analysis operation, a syntax analysis operation, a dialogue act analysis operation, and a dialogue processing operation on the text data.

The morpheme analysis operation is an operation of classifying text data corresponding to speech uttered by the user into morpheme units, which are the smallest units having meaning, and determining which part of speech each classified morpheme has. The syntax analysis operation is an operation of classifying the text data into a noun phrase, a verb phrase, an adjective phrase, or the like using a result of the morpheme analysis operation, and determining a relation between the phrases. Through the syntax analysis operation, the subject, object, and modifiers of the speech spoken by the user can be determined. The dialogue act analysis operation is an operation of analyzing the intention of the speech uttered by the user using the result of the syntax analysis operation. Specifically, the dialogue act analysis operation is an operation of determining the intent of the sentence, such as whether the user asks a question, makes a request, or expresses a simple emotion. The dialog processing operation is an operation for determining whether to answer the user's utterance, respond to the utterance, or ask a question inquiring additional information, using a result of the speech act analysis operation.

After the dialog processing operation, the NLP server 400 can generate intention analysis information including one or more of an answer to the intention uttered by the user, and a response to the intention and an additional information inquiry.

Meanwhile, the NLP server 400 can receive text data from the artificial intelligence device 100. For example, when the artificial intelligence device 100 supports a speech-to-text conversion function, the artificial intelligence device 100 can convert speech data into text data and transmit the converted text data to the NLP server 400.

The speech synthesis server 500 can generate a synthesized speech by combining pieces of pre-stored speech data. The speech synthesis server 500 can record the speech of a person selected as a model, and divide the recorded speech into syllables or words. The speech synthesis server 500 can store the speech divided in units of syllables or words in an internal or external database.

The speech synthesis server 500 can search for syllables or words corresponding to given text data from the database and synthesize a combination of the syllables or the words searched to generate a synthesized speech.

The speech synthesis server 500 can store a plurality of speech language groups respectively corresponding to a plurality of languages. For example, the speech synthesis server 500 can include a first speech language group recorded in Korean, and a second speech language group recorded in English.

The speech synthesis server 500 can translate text data of a first language into text of a second language, and generate a synthesized speech corresponding to the translated text of the second language by using a second speech language group.

The artificial intelligence system 1 can further include an artificial intelligence server 200. The artificial intelligence server 200 allows at least one of an STT engine used in the STT server 300, an NLP engine used in the NLP server 400, and a speech synthesis engine used in the speech synthesis server 500 to be learned. That is, at least one of the STT server 300, the NLP server 400, and the speech synthesis server 500 can use models or engines trained in the artificial intelligence server 200.

In FIG. 5, the artificial intelligence device 100, the STT server 300, the NLP server 400, and the speech synthesis server 500 are illustrated as being separate from each other, but the present disclosure is not limited thereto. In an embodiment, some of the artificial intelligence server 200, the STT server 300, the NLP server 400, or the speech synthesis server 500 can be configured as one server. In an embodiment, some of the STT server 300, the NLP server 400 or the speech synthesis server 500 can be included in the artificial intelligence device 100, which implies that the artificial intelligence device 100 performs functions of the STT server 300, the NLP server 400 or the speech synthesis server 500.

FIG. 6 is a diagram illustrating artificial intelligence systems 1 that provide a device control function based on pairing between devices according to various embodiments of the present disclosure. Referring to FIG. 6, the artificial intelligence system 1 essentially includes the artificial intelligence device 100, and may optionally further include at least one or more of an artificial intelligence server 200 and an IoT (Internet of Things) device 600.

The artificial intelligence system 1 that provides a device control function based on inter-device pairing may include at least two or more of artificial intelligence devices 100 or IoT devices 600 which are targets for paring in order to provide a device control function. That is, the artificial intelligence system 1 may include only a plurality of artificial intelligence devices 100, or may include one or more artificial intelligence devices 100 and one or more IoT devices 600.

At least some of the artificial intelligence device 100, the artificial intelligence server 200, or the IoT device 600 included in the artificial intelligence system 1 can communicate with each other based on wired/wireless communication technology. All of the artificial intelligence device 100, the artificial intelligence server 200, or the IoT device 600 included in the artificial intelligence system 1 can directly communicate with each other, or some thereof can directly communicate with each other. In particular, the artificial intelligence device 100 or the IoT device 600 included in the artificial intelligence system 1 can directly or indirectly communicate with each other.

Two devices communicating with each other indirectly can mean that the two devices communicate with each other through at least one or more third devices (e.g., artificial intelligence device 100, artificial intelligence server 200, or IoT device 600). On the other hand, two devices communicating with each other directly can mean that the two devices directly communicate with each other through or without a communication-dedicated device (e.g., a base station, a router, etc.).

In FIG. 6, (a) and (b) show artificial intelligence systems 1 including a first artificial intelligence device 100_1, a second artificial intelligence device 100_2, an artificial intelligence server 200, and an IoT device 600, and (c) shows an artificial intelligence system 1 including the first artificial intelligence device 100_1, the second artificial intelligence device 100_2, and the IoT device 600.

In the embodiment shown in (a) of FIG. 6, the first artificial intelligence device 100_1, the second artificial intelligence device 100_2, the artificial intelligence server 200 and the IoT device 600 can directly communicate with one another.

In the embodiment shown in (b) of FIG. 6, the first artificial intelligence device 100_1, the artificial intelligence server 200 and the IoT device 600 can communicate directly with one another, and the second artificial intelligence device 100_2 can directly communicate with the first artificial intelligence device 100_1. Accordingly, the second artificial intelligence device 100_2 can communicate with the IoT device 600 only through the first artificial intelligence device 100_1.

In the embodiment shown in (c) of FIG. 6, the first artificial intelligence device 100_1 can directly communicate with the second artificial intelligence device 100_2 and the IoT device 600, and the second artificial intelligence device 100_2 can directly communicate with the first artificial intelligence device 100_1, and the IoT device 600 can directly communicate with the first artificial intelligence device 100_1. Accordingly, the second artificial intelligence device 100_2 and the IoT device 600 can indirectly communicate with each other through the first artificial intelligence device 100_1.

As shown in (a) to (c) of FIG. 6, the artificial intelligence device 100 or the IoT device 600 included in the artificial intelligence system 1 can directly or indirectly communicate with each other.

The artificial intelligence device 100 included in the artificial intelligence system 1 can perform inter-device pairing with another artificial intelligence device 100 or the IoT device 600 through communication, and store information on the paired devices. Further, when the artificial intelligence device 100 is connected to the artificial intelligence server 200, the artificial intelligence device 100 can transmit information on the paired devices to the artificial intelligence server 200.

The information on the paired devices can include at least one or more of device identification information, a communication method, and a pairing platform which are associated with devices that are paired with each other. The information on the paired devices can be stored in the form of a table, which can be referred to as a pairing information table. The pairing information table can be stored in the memory 170 of the artificial intelligence device 100 or the memory 230 of the artificial intelligence server 200.

The device identification information can include a device serial number corresponding to each device (such as an artificial intelligence device or an IoT device). The communication method refers to a communication method of paired devices, and can include Bluetooth, Wi-Fi, cellular network, Ethernet, infrared communication, and the like. The pairing platform can refer to a service platform or a command platform used by paired devices to interact each other, and can include a value indicating a corresponding platform, a list of APIs, grammar rules, and the like.

For example, the pairing information table for the first artificial intelligence device 100_1 shown in (b) of FIG. 6 can include pairing information of the first artificial intelligence device 100_1. Specifically, a first item of the pairing information table for the first artificial intelligence device 100_1 shown in in (b) of FIG. 6 can be pairing information between the first artificial intelligence device 100_1 and the second artificial intelligence device 100_2, and a second item can be pairing information between the first artificial intelligence device 100_1 and the IoT device 600. Furthermore, a third item of the pairing information table for the first artificial intelligence device 100_1 shown in (b) of FIG. 6 can be pairing information between the first artificial intelligence device 100_1 and the artificial intelligence server 200.

The artificial intelligence server 200 can receive the pairing information table from the connected artificial intelligence device 100 and manage the pairing information table received from several artificial intelligence devices 100.

Some of the artificial intelligence device 100, the artificial intelligence server 200, or the IoT device 600 included in the artificial intelligence system 1 can share their pairing information tables among connected devices. For example, in the artificial intelligence system 1 shown in (b) of FIG. 6, the second artificial intelligence device 100_2 can share its own pairing information table (the second pairing information table) with the paired first artificial intelligence device 100_1, and the first artificial intelligence device 100_1 can store and manage its own pairing information table (first pairing information table) as well as the pairing information table (second pairing information table) received from the second artificial intelligence device 100_2.

In this instance, when the artificial intelligence device 100 needs to connect with a target device (e.g., another artificial intelligence device 100, the artificial intelligence server 200, the IoT device 600, or the like), the artificial intelligence device 100 can establish a connection path based on at least a part of its own pairing information table or the pairing information table received from another device, generate a command for performing a specific operation in consideration of the determined connection path, and transmit the generated command to the target device via the determined connection path to allow the target device to perform the specific operation.

Alternatively, for device-to-device security, the artificial intelligence device 100 included in the artificial intelligence system 1 does not share its pairing information table with other artificial intelligence devices 100 or IoT devices 600, and shares its own pairing information table only with the artificial intelligence server 200. In this instance, the artificial intelligence device 100 can query another device whether the artificial intelligence device 100 connects to a desired target device, and receive connectivity information or a connection path from the other device to indirectly use a pairing information table of the other device.

When the artificial intelligence device 100 needs to connect with a target device (e.g., another artificial intelligence device 100, the artificial intelligence server 200, the IoT device 600, or the like), the artificial intelligence device 100 can establish a connection path based on at least a part of its own pairing information table or connectivity information received from paired other devices, generate a command for performing a specific operation in consideration of the determined connection path, and transmit the generated command to the target device via the determined connection path to allow the target device to perform the specific operation.

The generated command can include transmitting device information and receiving device information. Also, when the transmitting device communicates with the receiving device through another device, that is, when another device exists between the transmitting device and the receiving device on a connection path, the generated command can further include waypoint device information. The transmitting device can refer to the artificial intelligence device 100 that generates a command, and the receiving device can refer to a target device that performs a specific operation or a destination device that is to receive the generated command and perform operation.

In addition, the artificial intelligence device 100 can receive the user's uttered speech, determine an operation with the target device or the receiving device by determining intention of the received user's uttered speech, and determine a connection path to the receiving device using the pairing information table, and generate and transmit a command for allowing the target device to perform the operation based on the determined connection path and the determined operation.

Further, the user's uttered speech can include a starting word for calling the transmitting device, a name or nickname indicating the receiving device, a command indicating an operation to be performed by the receiving device, and the like. The starting word for calling the transmitting device can be a name or a nickname indicating the transmitting device, or can be a starting word set in a speech recognition platform installed in the transmitting device or used by the transmitting device.

Figure 7:
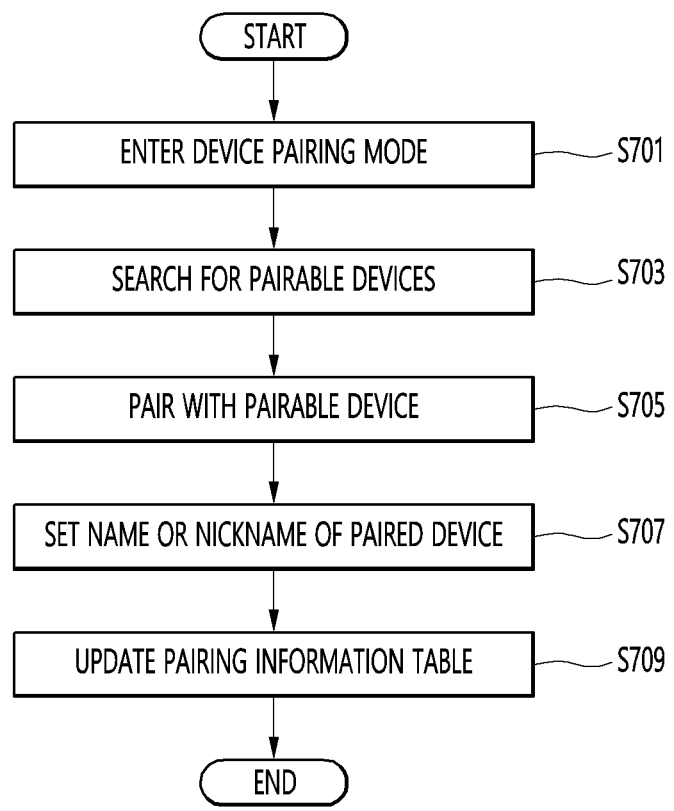
FIG. 7 is an operation flowchart illustrating a method of providing a device control function based on inter-device pairing according to an embodiment of the present disclosure.

Next, FIG. 7 is an operation flowchart illustrating a method of providing a device control function based on inter-device pairing according to an embodiment of the present disclosure. Specifically, FIG. 7 illustrates an operation flowchart showing a method by which an artificial intelligence device 100 pairs with another device (e.g., another artificial intelligence device 100 or the IoT device 600) to provide a device control function based on inter-device pairing according to an embodiment of the present disclosure.

Referring to FIG. 7, the processor 180 of the artificial intelligence device 100 enters a device pairing mode (S701). The device pairing mode refers to a mode in which the artificial intelligence device 100 attempts to pair with another artificial intelligence device 100 or the IoT device 600. Entering the device pairing mode includes the device pairing mode is activated.

The processor 180 can enter the device pairing mode when a device pairing application is executed or a setting item for device pairing is entered. Then, the processor 180 of the artificial intelligence device 100 searches for pairable devices through the communication unit 110 (S703).

Searching for pairable devices includes detecting a pairing request signal output from another device by using a communication technology available for inter-device pairing in the communication unit 110, or outputting a pairing request signal through the communication unit 110 and detecting the pairing request signal output from another device in response to the pairing request signal. Then, the processor 180 of the artificial intelligence device 100 can pair with the found pairable device (S705).

When a plurality of pairable devices are found, the processor 180 can output a pairable device list including a plurality of pairable devices through the display unit 151, and pair with a device selected by a user input through the input unit 120. The paired device can be referred to as a target device.

When one pairable device is found, the processor 180 can output a pairable device list including the one found pairable device through the display unit 151, or a notification asking whether to pair with the one found pairable device, and pair with the one found pairable device based on a user input through the input unit 120.

The processor 180 can obtain identification information, device name information, device type information, communication address information, and the like of a device found in a device pairing process. The identification information of the paired device may include a serial number of the paired device. The communication address information can include an IP address (Internet Protocol Address), a MAC address (Media Access Control Address), a Bluetooth address, and the like.

Then, the processor 180 of the artificial intelligence device 100 can set the name or nickname of the paired device (S707). The step (S707) of setting the name or nickname of the paired device can be selectively performed. The name or nickname of the paired device can be set based on a user input through the input unit 130, and the user input can include text or speech uttered by a user. Thereafter, the processor 180 of the artificial intelligence device 100 can update the pairing information table (S709).

The pairing information table can include identification information, name, nickname, type information, communication method, pairing platform, and the like of the paired device. In particular, the pairing information table can include information associated with paired devices. The pairing information table can include pairing information on paired devices, and the processor 180 can update the pairing information table by adding the pairing information on a newly paired device to the pairing information table.

In an embodiment, the processor 180 of the artificial intelligence device 100 can transmit the updated pairing information table to the artificial intelligence server 200 or the paired device through the communication unit 110. Similarly, the processor 180 of the artificial intelligence device 100 can receive a pairing information table of another paired device from the artificial intelligence server 200 or the paired device through the communication unit 110.

As described above, the device pairing method according to an embodiment of the present disclosure may not include a process of pairing a user's account with a device, but only include a process of performing inter-device pairing. Accordingly, in an embodiment of the present disclosure, there is an advantage that inter-device pairing is possible without being dependent on a specific user through pairing between devices.

The order of the steps shown in FIG. 7 is only an example, and the present disclosure is not limited thereto. That is, according to an embodiment, the order of some of the steps shown in FIG. 7 can be performed in reverse. In an embodiment, some of the steps shown in FIG. 7 can be performed in parallel. Also, only some of the steps shown in FIG. 7 can be performed. In addition, FIG. 7 illustrates one cycle of a method in which the artificial intelligence device 100 pairs with other devices, and the present disclosure is not limited thereto. That is, the steps shown in FIG. 7 can be repeatedly performed, and accordingly, the artificial intelligence device 100 can pair with several devices.

Figure 8:
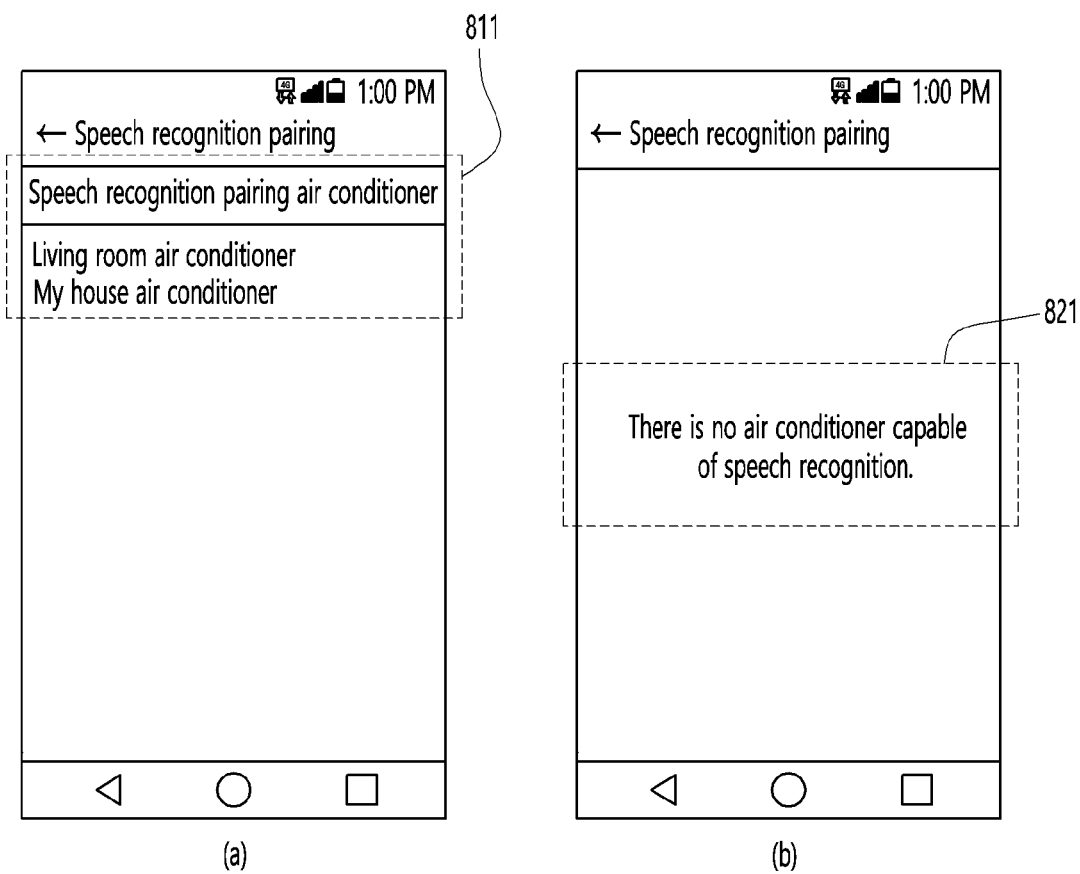

FIG. 8 is a diagram illustrating a device pairing interface for providing information on a paired device according to an embodiment of the present disclosure. Referring to FIG. 8, the processor 180 of the artificial intelligence device 100 can provide a device pairing interface that provides information on a paired device through the display unit 151, and the device pairing interface can include a paired device list 811 indicating a currently paired device.

When there is a device paired with the artificial intelligence device 100, the processor 180 can provide a device pairing interface including a paired device list 811 indicating the paired device ((a) of FIG. 8). On the other hand, when there is no device paired with the artificial intelligence device 100, the processor 180 can provide a device pairing interface including a notification 821 indicating that there is no paired device or an empty paired device list ((b) of FIG. 8).

Figure 9:
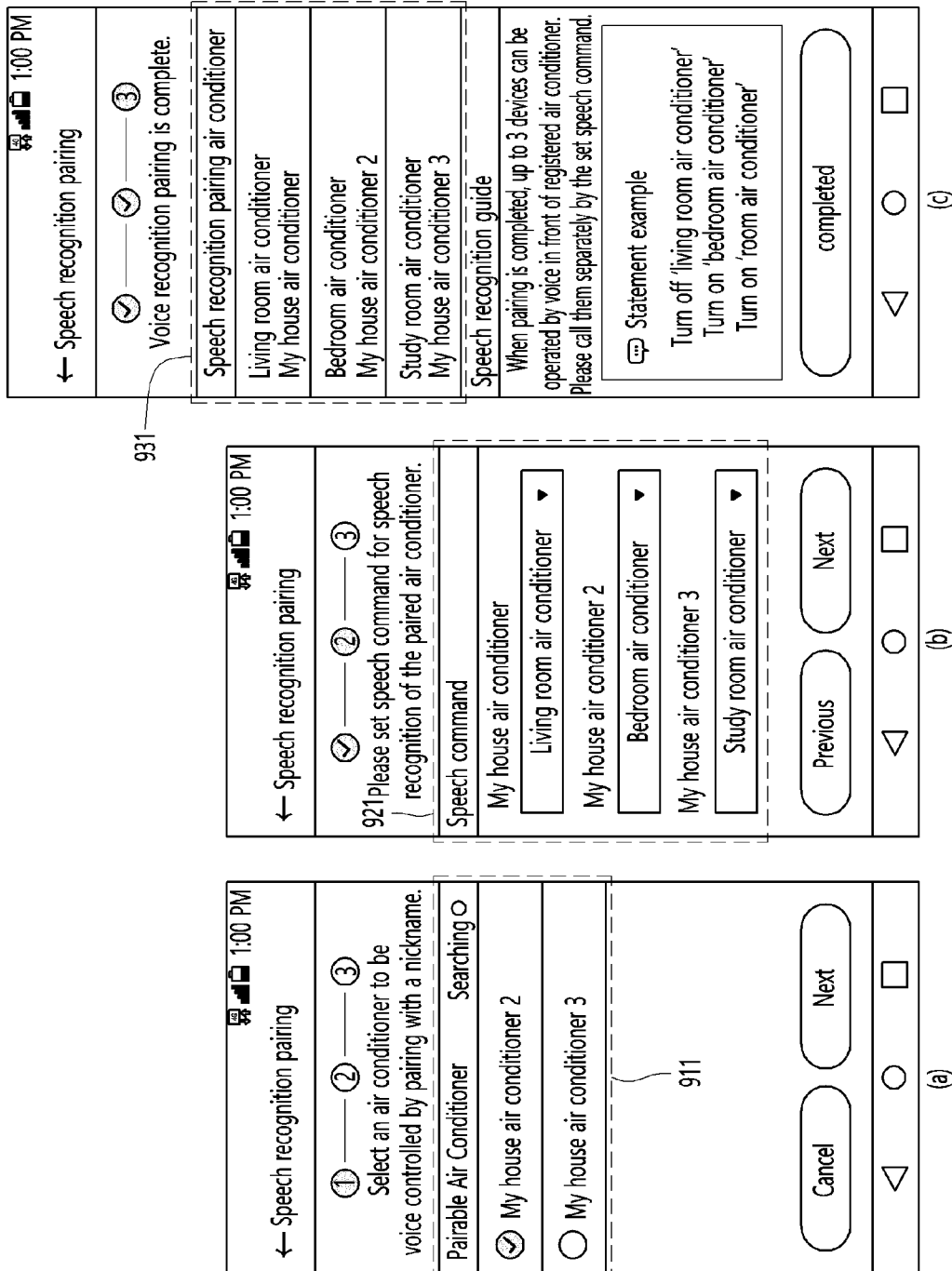
FIG. 9 is a diagram illustrating device pairing interfaces providing information on a paired device and a new device according to an embodiment of the present disclosure.

FIG. 9 is a diagram illustrating a device pairing interface pairing with a new device according to an embodiment of the present disclosure. Referring to FIG. 9, the processor 180 of the artificial intelligence device 100 can provide a device pairing interface that pairs with a new device through the display unit 151, and the device pairing interface can include at least one or more of a pairable device list 911, a name setting interface 921 for a paired device, and a paired device list 931.

When a device pairing mode is entered, the processor 180 can search for pairable devices and provide a device pairing interface including the pairable device list 911 indicating the found pairable devices ((a) of FIG. 9). In addition, the processor 180 can pair with at least one of the pairable devices included in the pairable device list 911 based on a user input through the input unit 120.

The processor 180 can provide the device pairing interface including the name setting interface 921 for setting a name of a paired device ((b) of FIG. 9). The set name of the paired device can refer to a nickname for calling the paired device by speech. For example, referring to (b) of FIG. 9, among devices paired with the artificial intelligence device 100, a device named "my house air conditioner 2" can be set to "bedroom air conditioner", and in this instance, the user can specify "my house air conditioner 2" by calling "bedroom air conditioner" with speech.

After pairing with the new device, the processor 180 can provide a device pairing interface including the paired device list 931 indicating the paired device ((c) of FIG. 9).

FIGS. 7 to 9 illustrate a method by which the artificial intelligence device 100 directly pairs with another device and a device pairing interface according to the method, but the present disclosure is not limited thereto. That is, in an embodiment, pairing between the artificial intelligence device 100 and other devices can be performed through a terminal connected to the artificial intelligence device 100, and the device pairing interface can be provided on a display unit provided in the terminal. Similarly, the artificial intelligence device 100 can perform an operation such as setting whether to pair with another device or setting a nickname of a device to be paired based on a user input through an input unit of the terminal.

Figure 10:
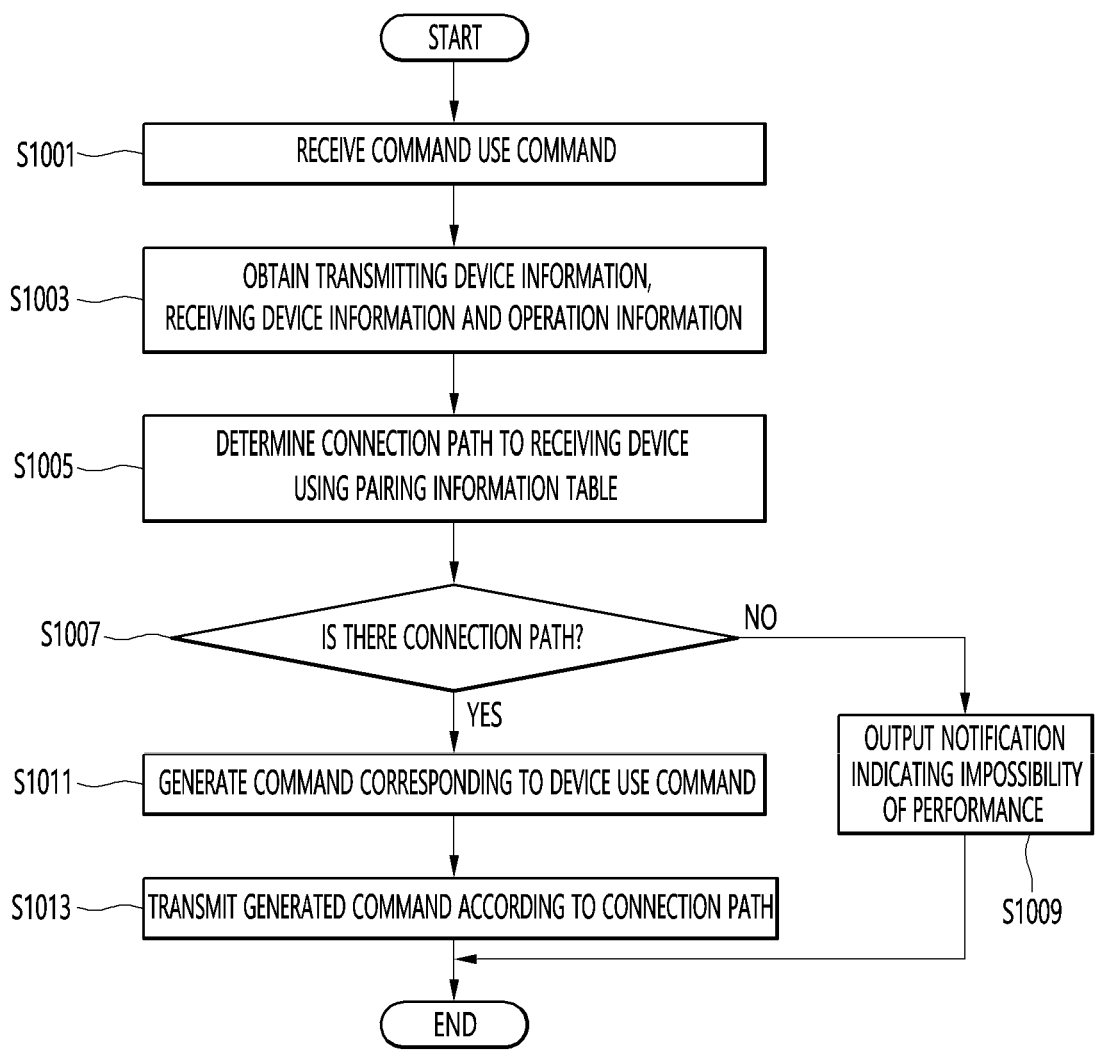
FIG. 10 is an operation flowchart illustrating a method of providing a device control function based on inter-device pairing according to an embodiment of the present disclosure.

FIG. 10 is an operation flowchart illustrating a method of providing a device control function based on inter-device pairing according to an embodiment of the present disclosure. Referring to FIG. 10, the processor 180 of the artificial intelligence device 100 can receive a device use command from a user through the input unit 120 (S1001).

The device use command may include a command for controlling an operation or state of a target device (or a receiving device) or a command for using a function of the target device. For example, when the target device is an air conditioner, the device use command may be a command to control power or operation of the air conditioner, or a command to request status information of the air conditioner. The device use command can also be referred to as a device use request.

The device use command can be input in the form of a speech uttered by a user, or can be input in the form of a touch on a device use interface or text. Then, the processor 180 of the artificial intelligence device 100 can obtain transmitting device information, receiving device information, and operation information by using the device use command (S1003).

Since the device use command includes information on an operation in the target device (or the reception device), the processor 180 can obtain the transmitting device information, the receiving device information and the operation information based on the device use command. Also, since the artificial intelligence device 100 functions as the transmitting device, the processor 180 can obtain the transmitting device information.

The transmitting device information is information for specifying the artificial intelligence device 100 as a transmitting device, and can include a name or a serial number of the artificial intelligence device 100. The receiving device information is information for specifying a receiving device (or target device) performing an operation, and can include a name, title, nickname, serial number, and the like of the receiving device. The operation information can indicate an operation to be performed by the receiving device (or the target device).

When the device use command is an uttered speech, the processor 180 of the artificial intelligence device 100 can convert the uttered speech into text directly or through the artificial intelligence server 200, and perform a natural language processing (NLP) technique on the converted text to determine the user's intention. Then, the processor 180 of the artificial intelligence device 100 can determine a connection path to the receiving device using the pairing information table (S1005).

The connection path to the receiving device includes a path for the artificial intelligence device 100 as a transmitting device to connect to the receiving device (or target device). When the artificial intelligence device 100 directly pairs with the receiving device, the connection path can include only the artificial intelligence device 100 as the transmitting device and the receiving device. On the other hand, when the artificial intelligence device 100 is paired with a specific intermediate device and the specific intermediate device is paired with the receiving device, the connection path can sequentially include the artificial intelligence device 100 as the transmitting device, the intermediate device, and the receiving device, and such a connection path means that the artificial intelligence device 100 can be connected to the receiving device through the intermediate device.

Further, the processor 180 can identify paired devices by using the pairing information table stored in the memory 170, and determine a connection path based the pairing information table.

The memory 170 can merely store a pairing information table (hereinafter, referred to as a first pairing information table) of the artificial intelligence device 100, but also pairing information tables (hereinafter, referred to as a second pairing information table) of paired devices received from the paired devices.

In an embodiment, the processor 180 can determine whether a receiving device is included among directly-paired devices by using its own first pairing information table stored in the memory 170. When the receiving device is included among the directly-paired devices, the processor 180 can determine a connection path. When the receiving device is not included among the directly-paired devices, the processor 180 can request a connection path from the transmitting device to the receiving device, from devices included in the first pairing information table that is, the directly-paired devices through the communication unit 110.

In addition, when a connection path is received from among the directly-paired devices, the processor 180 can determine a connection path based on the received connection path. Here, the directly-paired devices can determine a connection path in the same method as the artificial intelligence device 100.

In an embodiment, the processor 180 can request a connection path to the receiving device from the artificial intelligence server 200 through the communication unit 110. The processor 260 of the artificial intelligence server 200 can determine a connection path from the transmitting device to the receiving device using pairing information tables received from each device (such as the artificial intelligence device 100 or the IoT device 600), and transmit the determined connection path to the artificial intelligence device 100 through the communication unit 210.

In an embodiment, the processor 180 can determine the connection path from the transmitting device to the receiving device using its own pairing information table (first pairing information table) stored in the memory 170 and pairing information tables of other devices (second pairing information tables).

Then, the processor 180 of the artificial intelligence device 100 can determine whether there is a connection path to the receiving device (S1007). When the processor 180 fails to determine the connection path, the processor 180 can determine that there is no connection path.

As a result of the determination in step S1007, when there is no connection path to the receiving device, the processor 180 of the artificial intelligence device 100 can output a notification indicating that the device use command cannot be performed, through the output unit 150 (S1009).

When there is no connection path to the receiving device indicating that the connection path to the receiving device cannot be determined, this can mean that the receiving device (or target device) to perform the device use command by the user input cannot be specified. Accordingly, since the processor 180 did not find a target for performing the device use command, the processor 180 can output a notification indicating that the device use command cannot be performed and terminate relevant procedure.

When there is a connection path to the receiving device as a result of the determination in step S1007, the processor 180 of the artificial intelligence device 100 can generate a command for performing an operation corresponding to the device use command in the receiving device (S1011). The generated command can include transmitting device information, receiving device information and operation information. Furthermore, the generated command may further include the connection path. Then, the processor 180 of the artificial intelligence device 100 can transmit the generated command according to the determined connection path through the communication unit 110 (S1013).

When the artificial intelligence device 100 as the transmitting device is directly connected to the receiving device in the connection path, the processor 180 can transmit the generated command to the receiving device through the communication unit 110. When the artificial intelligence device 100 as the transmitting device is connected to the receiving device through at least one intermediate device on the connection path, the processor 180 can transmit the generated command to an intermediate device directly paired with the artificial intelligence device 100 on the connection path through the communication unit 110.

The order of the steps shown in FIG. 10 is only an example, and the present disclosure is not limited thereto. That is, according to an embodiment, the order of some of the steps shown in FIG. 10 can be performed in reverse. Further, in an embodiment, some of the steps shown in FIG. 10 can be performed in parallel or only some of the steps shown in FIG. 10 can be performed.

Further, FIG. 10 illustrates only one cycle of a method by which the artificial intelligence device 100 provides a device control function, and the present disclosure is not limited thereto. That is, the steps shown in FIG. 10 can be repeatedly performed, and accordingly, the artificial intelligence device 100 can perform control for an external device several times.

Figure 11:
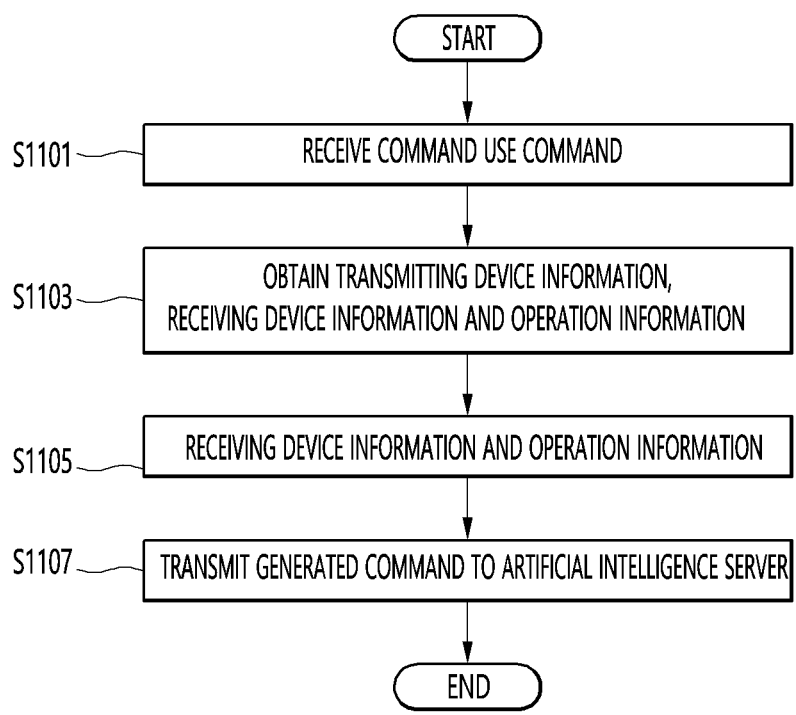
FIG. 11 is an operation flowchart illustrating a method of providing a device control function based on inter-device pairing according to an embodiment of the present disclosure.

Next, FIG. 11 is an operation flowchart illustrating a method of providing a device control function based on inter-device pairing according to an embodiment of the present disclosure. A description overlapping that given with reference to FIG. 10 will be omitted.

Referring to FIG. 11, the processor 180 of the artificial intelligence device 100 can receive a device use command from a user through the input unit 120 (S1101). This step corresponds to step S1001 of receiving the device use command shown in FIG. 10.

Then, the processor 180 of the artificial intelligence device 100 can obtain transmitting device information, receiving device information, and operation information by using the device use command (S1103). This step corresponds to the step S1003 of obtaining the transmitting device information, the receiving device information and the operation information shown in FIG. 10.

The processor 180 of the artificial intelligence device 100 can generate a command for performing an operation corresponding to the device use command in the receiving device (S1105). The generated command may include transmitting device information, receiving device information and operation information. The generated command may include a command to transmit the generated command to the receiving device.

Then, the processor 180 of the artificial intelligence device 100 can transmit the generated command to the artificial intelligence server 200 through the communication unit 110 (S1107). The artificial intelligence server 200 can identify the receiving device in the command received from the artificial intelligence device 100, determine whether there is a connection path from the artificial intelligence device 100 as a transmitting device to the receiving device, and when there is a connection path, transmit the received command to the identified receiving device.

The order of the steps shown in FIG. 11 is only an example, and the present disclosure is not limited thereto. That is, according to an embodiment, the order of some of the steps shown in FIG. 11 can be performed in reverse. Further, in an embodiment, some of the steps shown in FIG. 11 can be performed in parallel or only some of the steps shown in FIG. 11 can be performed.

FIG. 11 illustrates only one cycle of a method by which the artificial intelligence device 100 provides a device control function, and the present disclosure is not limited thereto. That is, the steps shown in FIG. 11 can be repeatedly performed, and accordingly, the artificial intelligence device 100 can perform control for an external device several times.

Next, FIG. 12 is a diagram illustrating an example of a pairing information table according to an embodiment of the present disclosure. Referring to FIG. 12, the pairing information table includes a name 1211 of a first paired device 1210, a nickname 1212 of the first paired device 1210, identification information 1213 of the first paired device 1210, a name 1221 of a second paired device 1220, a nickname 1222 of the second paired device 1220, identification information 1223 of the second paired device 1220, a communication method 1230 between paired devices, and a pairing platform 1240 between paired devices. FIG. 12 can be a pairing information table of the first artificial intelligence device.

According to the first pairing information 1251, a first artificial intelligence device and a second artificial intelligence device are paired with each other on the first platform, and the first artificial intelligence device and the second artificial intelligence device can communicate with each other via Wi-Fi. According to the second pairing information 1252, the first artificial intelligence device and a third artificial intelligence device are paired with each other on the first platform, and the first artificial intelligence device and the third artificial intelligence device can communicate with each other via Wi-Fi.

According to the third pairing information 1253, the first artificial intelligence device and the IoT device are paired with each other on the second platform, and the first artificial intelligence device and the IoT device can communicate with each other via Bluetooth Low Energy (BLE). According to the fourth pairing information 1254, the first artificial intelligence device and the artificial intelligence server are paired with each other on the first platform, and the first artificial intelligence device and the artificial intelligence server can communicate with each other via Ethernet or Wi-Fi. The pairing information table can be updated in a situation in which a new device is paired or an existing paired device is disconnected.

Figure 13:
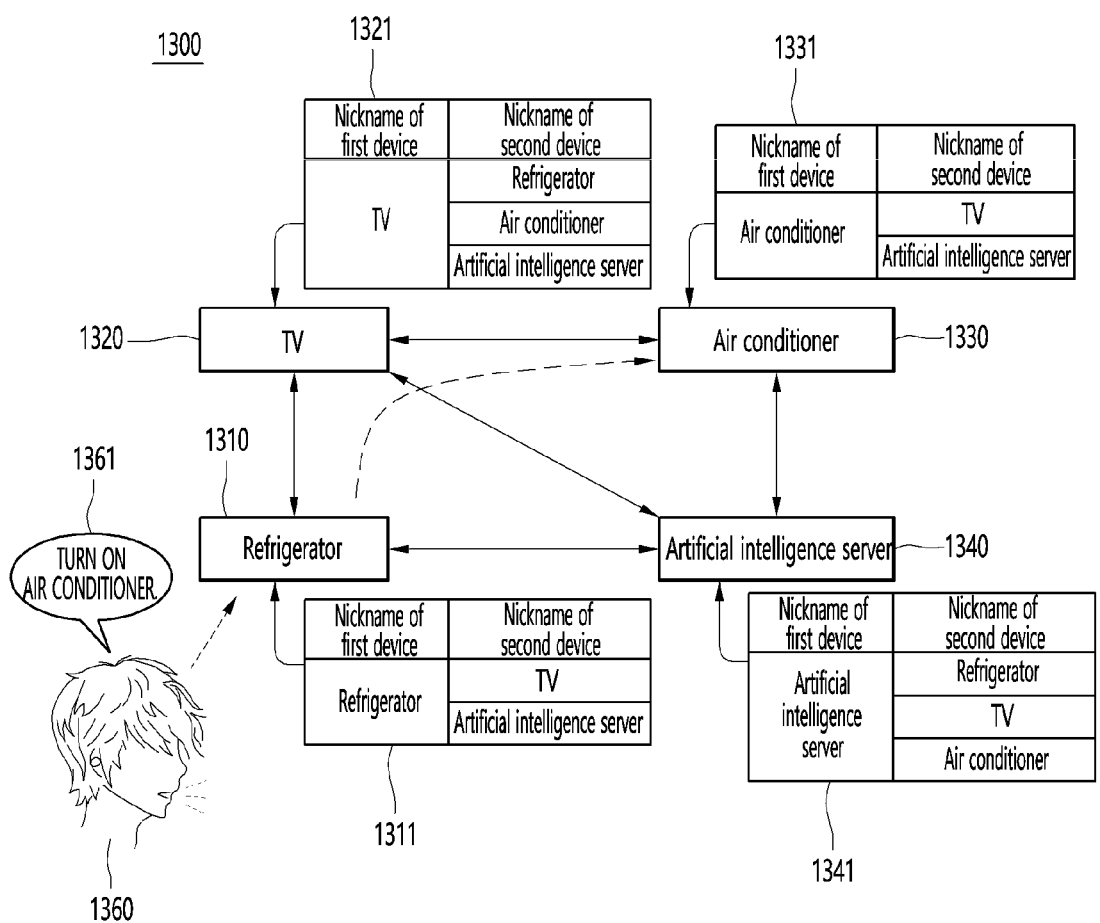
FIGS. 13 to 15 are diagrams illustrating artificial intelligence systems according to various embodiments of the present disclosure.
Figure 14:
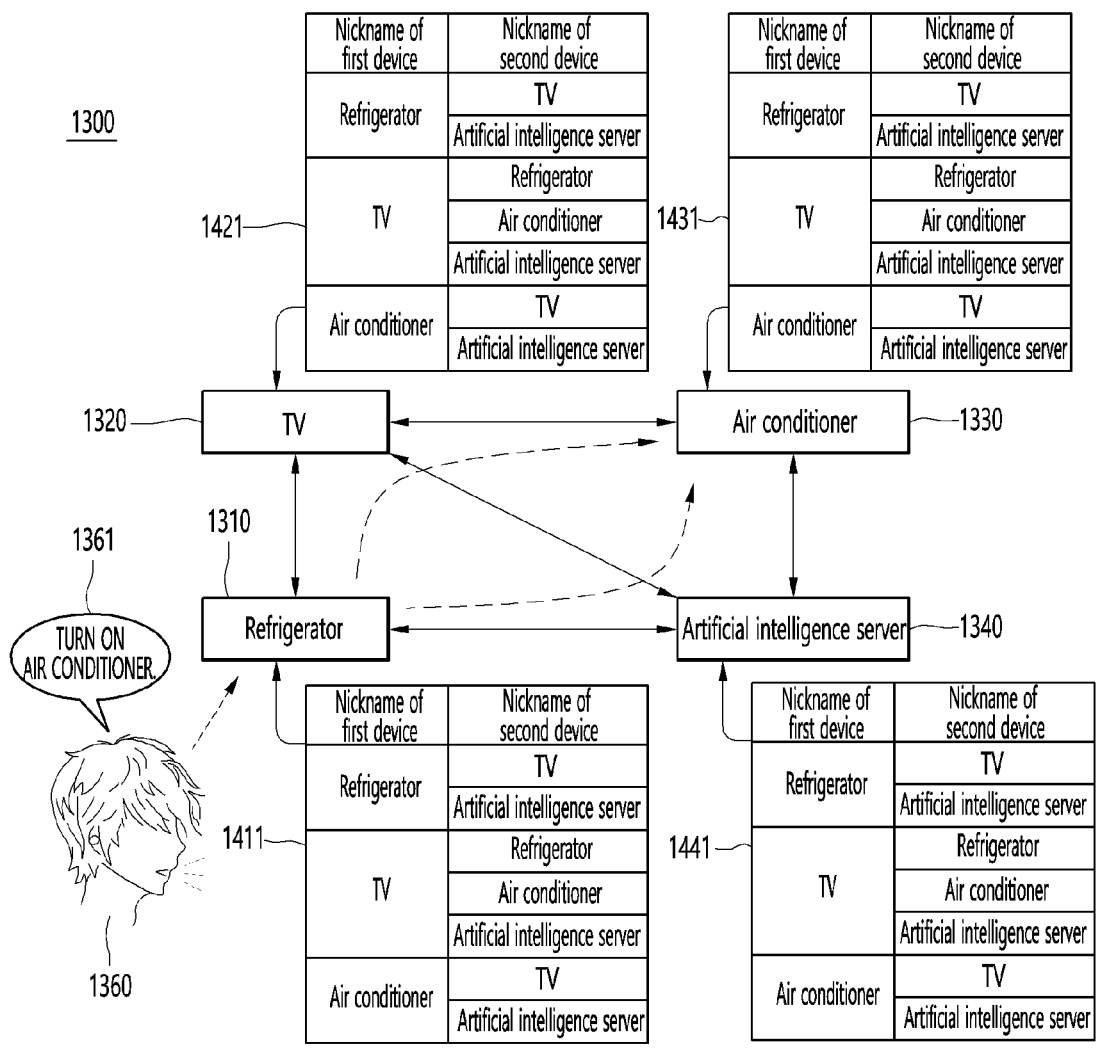
Figure 15:
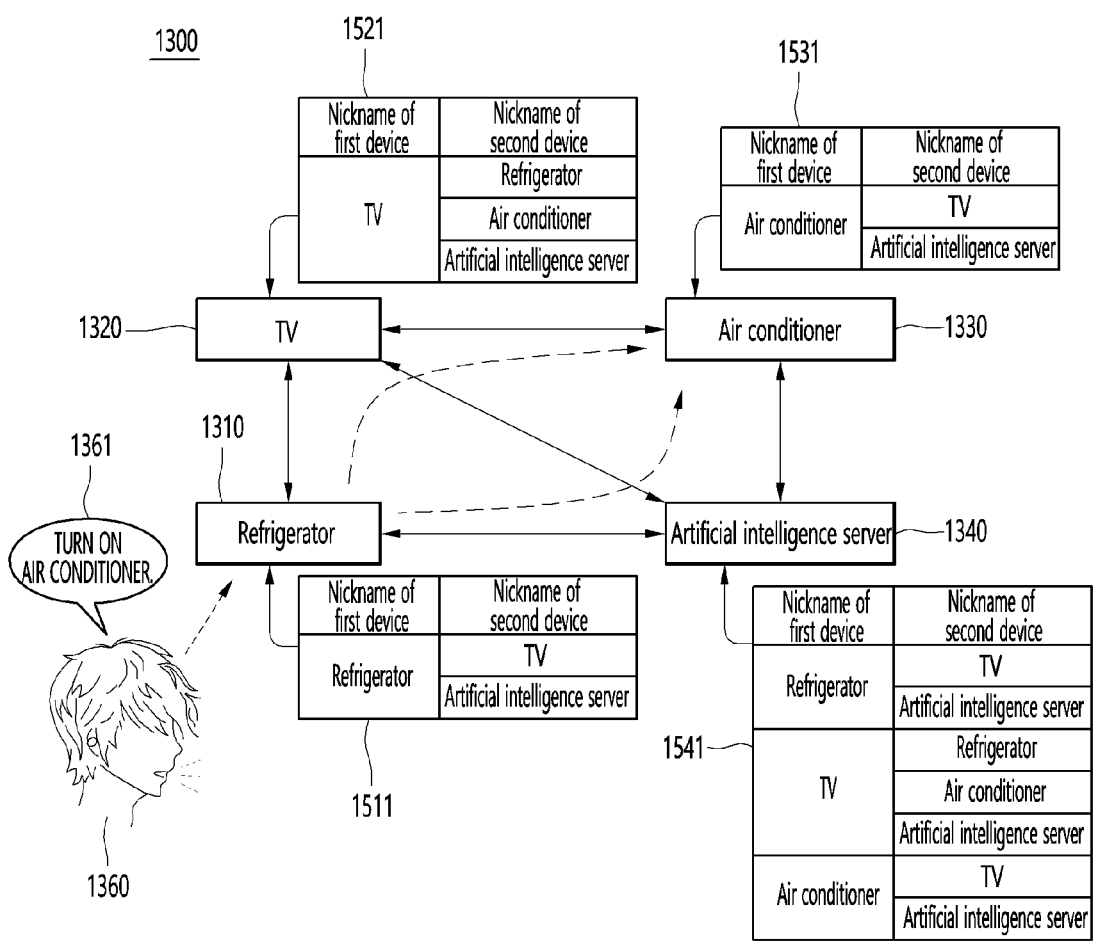

FIGS. 13 to 15 are diagrams illustrating artificial intelligence systems according to various embodiments of the present disclosure. In particular, FIGS. 13 to 15 illustrate an artificial intelligence system 1300 including a refrigerator 1310 as a first artificial intelligence device, a TV 1320 as a second artificial intelligence device, and an air conditioner 1330 as a third artificial intelligence device, and an artificial intelligence server 1340. The refrigerator 1310 can be paired with the TV 1320 and the artificial intelligence server 1340. The TV 1320 can be paired with the refrigerator 1310, the air conditioner 1330, and the artificial intelligence server 1340. The air conditioner 1330 can be paired with the TV 1320 and the artificial intelligence server 1340. That is, the refrigerator 1310 is indirectly connected to the air conditioner 1330 through the TV 1320.

In addition, although the pairing information tables 1311, 1321, 1331 and 1341 respectively stored in the devices 1310, 1320, 1330, and 1340 are shown in FIGS. 13 to 15, only the nickname of the first device and the nickname of the second device are displayed among several items included in the illustrated pairing information table. That is, the pairing information table actually stored in each device can further include not only the items shown in FIGS. 13 to 15, but also the name, identification information, pairing platform, communication method, and the like of each device.

As shown in FIGS. 13 to 15, a user 1360 can input a device use command for turning on the power of the air conditioner 1330 by uttering "Power on air conditioner" 1361 with respect to the refrigerator 1310. When the refrigerator 1310 obtains the uttered speech 1361 of the user 1360, the refrigerator 1310 can analyze the user's intention to determine the refrigerator 1310 as a transmitting device, the keyword "air conditioner" as the receiving device information, and "power on" as the operation information. Since the refrigerator 1310 has not yet identified whether the keyword "air conditioner" for the receiving device obtained from the user's uttered speech indicates the air conditioner 1330 included in the artificial intelligence system 1300, the receiving device information can be determined only in the form of keyword "air conditioner." For example, the refrigerator 1310 can determine "intent" item as "power on" in the intention information, and determine "device keyword," which is a sub item of "slot" item, as "air conditioner" as additional information. Since a device corresponding to "air conditioner" has not yet been identified, it is unclear whether "air conditioner" is a name or a nickname of a paired device, and therefore "air conditioner" can be classified as a device keyword item.

FIG. 13 shows an embodiment in which each device 1310, 1320, 1330, or 1340 does not transmit its own pairing information table (first pairing information table) to other devices. Referring to FIG. 13, a refrigerator 1310 can store only a pairing information table 1311 of the refrigerator 1310, a TV 1320 can store only a pairing information table 1321 of the TV 1320, an air conditioner 1330 can store only a pairing information table 1331 of the air conditioner 1330, and an artificial intelligence server 1340 can store only a pairing information table 1341 of the artificial intelligence server 1340.

The refrigerator 1310 can determine whether there is a device corresponding to a keyword "air conditioner" among directly-paired devices based on the pairing information table 1311. However, since the refrigerator 1310 is not directly paired with the air conditioner 1330, the refrigerator 1310 can request a connection path to the device corresponding to the keyword "air conditioner" from the TV 1320 or the artificial intelligence server 1340 as a paired device included in the pairing information table 1311.

Since the TV 1320 is paired with the air conditioner 1330 based on the pairing information table 1321 and the nickname of the air conditioner 1330 is "air conditioner," the device corresponding to the keyword "air conditioner" can be determined as the air conditioner 1330. In addition, the TV 1320 can determine a connection path to the air conditioner 1330 as "TV→air conditioner" and transmit the connection path to the refrigerator 1310. The information transmitted by the TV 1320 to the refrigerator 1310 can further include information on the air conditioner 1330 as a receiving device and information on the TV 1320 as an intermediate device, in addition to the connection path.

The refrigerator 1310 can recognize that the device corresponding to the keyword "air conditioner" is the air conditioner 1330 based on the information received from the TV 1320, and determine the connection path to the air conditioner 1330 as "refrigerator→TV→air conditioner." In addition, the refrigerator 1310 can generate a command to turn on the power of the air conditioner 1330 in consideration of the determined connection path, and transmit the generated command to the TV 1320 according to the connection path. The transmitted command can include information on the refrigerator 1310 as a transmitting device, information on the air conditioner 1330 as a receiving device, "power on" as operation information and the like.

The TV 1320 can transmit the command received from the refrigerator 1310 to the air conditioner 1330 based on the connection path included in the command received from the refrigerator 1310 or separately received from the refrigerator 1310. In addition, the air conditioner 1330 can perform an operation of turning on the power based on the received command. Accordingly, the refrigerator 1310 can perform a device use command associated with the air conditioner 1330 that is not directly paired, through the TV 1320.

FIG. 14 shows an embodiment in which each device 1310, 1320, 1330, or 1340 transmits its own pairing information table (first pairing information table) to other devices. Referring to FIG. 14, a refrigerator 1310, a TV 1320, an air conditioner 1330, and an artificial intelligence server 1340 share a pairing information table with each other, and respectively store a pairing information table 1411, 1421, 1431 and 1441 including pairing information of various devices.

The refrigerator 1310 can determine whether there is a device corresponding to keyword "air conditioner" among directly-paired devices based on the pairing information table 1411, and can determine that the device corresponding to the keyword "air conditioner" is the air conditioner 1330. In addition, the refrigerator 1310 can determine a connection path from the refrigerator 1310 to the air conditioner 1330 based on the stored pairing information table 1441 as "refrigerator→TV→air conditioner" and "refrigerator→artificial intelligence server→air conditioner."

The refrigerator 1310 can determine the connection path as one of "refrigerator→TV→air conditioner" and "refrigerator→artificial intelligence server→air conditioner" based on a preset communication protocol or a user input. In addition, the refrigerator 1310 can generate a command to turn on the power of the air conditioner 1330 in consideration of the determined connection path, and transmit the generated command to the TV 1320 or the artificial intelligence server 1340 according to the connection path. The transmitted command can include information on the refrigerator 1310 as a transmitting device, information on the air conditioner 1330 as a receiving device, "power on" as operation information and the like.

The TV 1320 or the artificial intelligence server 1340 can transmit the command received from the refrigerator 1310 to the air conditioner 1330 based on the connection path included in the command received from the refrigerator 1310 or separately received from the refrigerator 1310. In addition, the air conditioner 1330 can perform an operation of turning on the power based on the received command. Accordingly, the refrigerator 1310 can perform a device use command associated with the air conditioner 1330 that is not directly paired, through the TV 1320 or the artificial intelligence server 1340.

FIG. 15 shows an embodiment in which devices 1310, 1320, 1330 except for the artificial intelligence server 1340 transmit their own pairing information tables (first pairing information tables) to the artificial intelligence server 1340. Referring to FIG. 15, the refrigerator 1310, the TV 1320 and the air conditioner 1330 share their pairing information tables with the artificial intelligence server 1340, and the artificial intelligence server 1340 can store a pairing information table 1541 including pairing information of the devices 1310, 1320, and 1330 paired with the artificial intelligence server 1340. In addition, the refrigerator 1310 can store only the pairing information table 1311 of the refrigerator 1310, the TV 1320 can store only the pairing information table 1321 of the TV 1320, and the air conditioner 1330 can store only the pairing information table 1341 of the air conditioner 1330.

The refrigerator 1310 can determine whether there is a device corresponding to a keyword "air conditioner" among directly-paired devices based on the pairing information table 1511. However, since the refrigerator 1310 is not directly paired with the air conditioner 1330, the refrigerator 1310 can request a connection path to the device corresponding to keyword "air conditioner" from the TV 1320 or the artificial intelligence server 1340 as a paired device included in the pairing information table 1311.

In the embodiment shown in FIG. 15, since the artificial intelligence server 1340 has obtained the pairing information table from each of the devices 1310, 1320 and 1330 unlike the embodiment shown in FIG. 13, the artificial intelligence server 1340 can determine a connection path with the receiving device even when the artificial intelligence server 1340 does not communicate with the other devices 1310, 1320, and 1330. In the embodiment of FIG. 15, similarly to FIG. 13, the TV 1320 can set a connection path and serve as an intermediate device for transmitting a command from the refrigerator 1310 to the air conditioner 1330.

The artificial intelligence server 1340 can identify that the nickname of the air conditioner 1330 is "air conditioner" based on the pairing information table 1541, and determine a device corresponding to the keyword "air conditioner" as the air conditioner 1330. Further, the artificial intelligence server 1340 can identify that the TV 1320 and the artificial intelligence server 1340 are respectively connected to the refrigerator 1310 and the air conditioner 1330 based on the pairing information table 1541, and determine the connection path to the air conditioner 1330 as "refrigerator→TV→air conditioner" and "refrigerator→artificial intelligence server→air conditioner" based on the identification. In addition, the artificial intelligence server 1340 can transmit the two determined connection paths to the refrigerator 1310. The information transmitted by the artificial intelligence server 1340 to the refrigerator 1310 can further include information on the air conditioner 1330 as a receiving device and information on the TV 1320 as an intermediate device, in addition to the connection path.

The refrigerator 1310 can identify that the device corresponding to the keyword "air conditioner" is the air conditioner 1330 based on the information received from the TV 1320, and determine a connection path as one of "refrigerator→TV→air conditioner" or "refrigerator→AI server→air conditioner" based on a preset communication protocol or a user input. In addition, the refrigerator 1310 can generate a command to turn on the power of the air conditioner 1330 in consideration of the determined connection path, and transmit the generated command to the TV 1320 or the artificial intelligence server 1340 according to the connection path. The transmitted command can include information on the refrigerator 1310 as a transmitting device, information on the air conditioner 1330 as a receiving device, "power on" as operation information and the like.

The TV 1320 or the artificial intelligence server 1340 can transmit the command received from the refrigerator 1310 to the air conditioner 1330 based on the connection path included in the command received from the refrigerator 1310 or separately received from the refrigerator 1310. In addition, the air conditioner 1330 can perform an operation of turning on the power based on the received command.

In another embodiment, the refrigerator 1310 does not determine a connection path, and can generate a command including information on the refrigerator 1310 as the transmitting device information, the keyword "air conditioner" as the receiving device information, and "power on" as the operation information with respect to the artificial intelligence server 1340 and transmit the generated command to the artificial intelligence server 1340. The artificial intelligence server 1340 can determines the receiving device as the air conditioner 1330 based on the receiving device information included in the command received from the refrigerator 1310, and transmit a command including "power on" as the operation information to the air conditioner 1330. In addition, the air conditioner 1330 can perform an operation of turning on the power based on the received command.

Accordingly, the refrigerator 1310 can perform a device use command associated with the air conditioner 1330 that is not directly paired, through the TV 1320 or the artificial intelligence server 1340.

According to an embodiment of the present disclosure, the above-described method can be implemented with codes readable by a computer on a medium in which a program is recorded. The computer-readable medium includes all kinds of recording devices in which data readable by a computer system is stored. Examples of the computer readable medium can include a hard disk drive (HDD), a solid state disk (SSD), a silicon disk drive (SDD), a ROM, a RAM, a CD-ROM, a magnetic tape, a floppy disk, an optical data storage device, and the like.

The invention claimed is:

1. An artificial intelligence device, comprising:
a communication unit;
a memory configured to store a pairing information table including pairing information on paired devices; and
a processor configured to:
search for pairable devices through the communication unit when entering a device pairing mode,
pair with a target device of the pairable devices found through the communication unit,
update the pairing information table by adding target pairing information associated with the target device to the pairing information table,
receive a device use command for controlling an operation of a particular device,
determine if the particular device corresponds to the paired target device by searching the updated paring information table,
determine a plurality of connection paths from the target device to the particular device based on the stored pairing information table, and
select a connection path from the plurality of connection paths based on a preset communication protocol or a user input,
wherein, in response to the particular device corresponding to the paired target device, the selected connection path is a direct connection path from the artificial intelligence device to the paired target device to directly communicate with and control the operation of the paired target device.

2. The artificial intelligence device of claim 1, wherein the processor is further configured to:
in response to the particular device not corresponding to the paired target device, indirectly communicate with and control the operation of the particular device using an indirect connection path from the artificial intelligence device to another paired device and then to the particular device.

3. The artificial intelligence device of claim 2, wherein the processor is further configured to:
determine if the particular device corresponds to the paired target device by searching the updated paring information table for a name, nickname or identification information identifying the particular device as being paired with the artificial intelligence device.

4. The artificial intelligence device of claim 3, wherein the processor is further configured to:
determine the particular device does not correspond to the paired target device when the updated pairing information table does include the name, nickname or identification identifying the particular device, and
output a notification indicating the particular device cannot be controlled using the device use command.

5. The artificial intelligence device of claim 2, wherein the processor is further configured to:
indirectly communicate with and control the operation of the particular device by requesting, from the another paired device, an indirect connection path from the artificial intelligence device to the particular device.

6. The artificial intelligence device of claim 2, wherein the processor is further configured to:
search the updated pairing information table for a connection path between the another paired device and the particular device, and
indirectly communicate with and control the operation of particular device by using a connection path from the artificial intelligence device to the another paired device and the connection path between the another device and the particular device.

7. The artificial intelligence device of claim 2, wherein the device use command is a speech uttered by a user, and
wherein the processor is further configured to perform natural language processing (NLP) on the device use command to determine connection information about the particular device.

8. The artificial intelligence device of claim 1, wherein the pairing information table includes at least one or more of identification information, a name, a nickname, type information, a communication method, and a pairing platform of the paired target device.

9. The artificial intelligence device of claim 8, wherein the processor is configured to set the name or nickname of the target device based on a user input, and
wherein the pairing information table includes the set name or nickname.

10. The artificial intelligence device of claim 1, wherein the target device is selected among the found pairable devices based on a user input.

11. The artificial intelligence device of claim 1, wherein the processor is further configured to share the updated pairing information table with at least one of the paired target device or an artificial intelligence server through the communication unit.

12. The artificial intelligence device of claim 9, wherein the another paired device for indirectly communicating with and controlling the particular device is selected based on a user input or a predetermined protocol when there are multiple other paired devices paired with the particular device.

13. A non-transitory computer-readable storage medium storing one or more programs configured to be executed by one or more processors of an artificial intelligence device, the one or more programs including instructions for:
storing, in a memory, a pairing information table including pairing information on paired devices;
searching for pairable devices through the communication unit when entering a device pairing mode;
pairing with a target device of the pairable devices found through the communication unit;
updating the pairing information table by adding pairing information associated with the target device to the pairing information table;
receiving a device use command for controlling an operation of a particular device;
determining if the particular device corresponds to the paired target device by searching the updated paring information table;
determining a plurality of connection paths from the target device to the particular device based on the stored pairing information table; and selecting a connection path from the plurality of connection paths based on a preset communication protocol or a user input,
wherein, in response to the particular device corresponding to the paired target device, the selected connection path is a direct connection path from the artificial intelligence device to the paired target device to directly communicate with and control the operation of the paired target device.

14. The non-transitory computer-readable storage medium of claim 13, wherein the one or more programs include further instructions for:
in response to the particular device not corresponding to the paired target device, indirectly communicating with and controlling the operation of the particular device using an indirect connection path from the artificial intelligence device to another paired device and then to the particular device.

15. The non-transitory computer-readable storage medium of claim 14, wherein the one or more programs include further instructions for:
determine if the particular device corresponds to the paired target device by searching the updated paring information table for a name, nickname or identification information identify the particular device as being paired with the artificial intelligence device.

16. The non-transitory computer-readable storage medium of claim 15, wherein the one or more programs include further instructions for:
determining the particular device does not correspond to the paired target device when the updated pairing information table does include the name, nickname or identification identifying the particular device; and
outputting a notification indicating the particular device cannot be controlled using the device use command.

17. The non-transitory computer-readable storage medium of claim 14, wherein the one or more programs include further instructions for:
indirectly communicating with and controlling the operation of the particular device by requesting, from the another paired device, an indirect connection path from the artificial intelligence device to the particular device.

18. The non-transitory computer-readable storage medium of claim 14, wherein the one or more programs include further instructions for:
searching the updated pairing information table for a connection path between the another paired device and the particular device; and
indirectly communicating with and controlling the operation of particular device by using a connection path from the artificial intelligence device to the another paired device and the connection path between the another paired device and the particular device.

19. A method for providing a device control function based on inter-device pairing, the method comprising:
storing, in a memory, a pairing information table including pairing information on paired devices;
searching for pairable devices through the communication unit when entering a device pairing mode;
pairing with a target device of the pairable devices found through the communication unit;
updating the pairing information table by adding pairing information associated with the target device to the pairing information table;
receiving a device use command for controlling an operation of a particular device;

determining if the particular device corresponds to the paired target device by searching the updated paring information table;

determining a plurality of connection paths from the target device to the particular device based on the stored pairing information table; and selecting a connection path from the plurality of connection paths based on a preset communication protocol or a user input, wherein, in response to the particular device corresponding to the paired target device, the selected connection path is a direct connection path from the artificial intelligence device to the paired target device to directly communicate with and control the operation of the paired target device.

20. The method of claim 13, further comprising:

in response to the particular device not corresponding to the paired target device, indirectly communicating with and controlling the operation of the particular device using an indirect connection path from the artificial intelligence device to another paired device and then to the particular device.

\* \* \* \* \*